(12) United States Patent
Kato et al.

(10) Patent No.: US 10,051,256 B2
(45) Date of Patent: Aug. 14, 2018

(54) IMAGE OBSERVATION APPARATUS

(71) Applicant: Olympus Corporation, Hachioji-shi, Tokyo (JP)

(72) Inventors: Shigeru Kato, Tokyo (JP); Sumito Honda, Tokyo (JP); Kensei Ito, Sagamihara (JP); Hiroshi Kodama, Tokyo (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/683,576

(22) Filed: Aug. 22, 2017

(65) Prior Publication Data

US 2018/0063503 A1 Mar. 1, 2018

(30) Foreign Application Priority Data

Aug. 26, 2016 (JP) ................................. 2016-166190

(51) Int. Cl.
  *H04N 7/18* (2006.01)
  *H04N 13/00* (2018.01)
  *H04N 7/22* (2006.01)

(52) U.S. Cl.
  CPC ........... *H04N 13/0018* (2013.01); *H04N 7/22* (2013.01); *H04N 13/0003* (2013.01); *H04N 7/18* (2013.01); *H04N 2013/0081* (2013.01)

(58) Field of Classification Search
  CPC ............ H04N 7/18; H04N 7/22; H04N 13/00; H04N 13/0018; H04N 13/0003; H04N 5/64

USPC ................................................... 348/143, 115
See application file for complete search history.

(56) References Cited

U.S. PATENT DOCUMENTS

| | | | | |
|---|---|---|---|---|
| 5,977,935 A | * | 11/1999 | Yasukawa | G02B 27/017 340/980 |
| 6,518,939 B1 | * | 2/2003 | Kikuchi | G06F 3/147 345/7 |
| 6,549,231 B1 | * | 4/2003 | Matsui | H04N 7/183 348/151 |
| 7,573,525 B2 | * | 8/2009 | Yamasaki | G02B 27/017 348/115 |
| 8,253,760 B2 | * | 8/2012 | Sako | H04N 13/044 345/589 |
| 9,335,547 B2 | * | 5/2016 | Takano | G06F 3/005 |

FOREIGN PATENT DOCUMENTS

| | | |
|---|---|---|
| JP | 2009-229676 | 10/2009 |
| JP | 2013-083994 | 5/2013 |

\* cited by examiner

*Primary Examiner* — Trang U Tran
(74) *Attorney, Agent, or Firm* — John C. Pokotylo; Pokotylo Patent Services

(57) ABSTRACT

An image observation apparatus 10 includes an imaging unit 30 that images a specimen K and obtains a magnified image of the specimen, a display 50 that displays an image, a condition determiner that determines whether a state of the specimen with respect to the imaging unit satisfies a specific condition, and a controller that displays the magnified image obtained by the imaging unit on the display when the condition determiner determines the state of the specimen with respect to the imaging unit satisfies the specific condition.

15 Claims, 40 Drawing Sheets

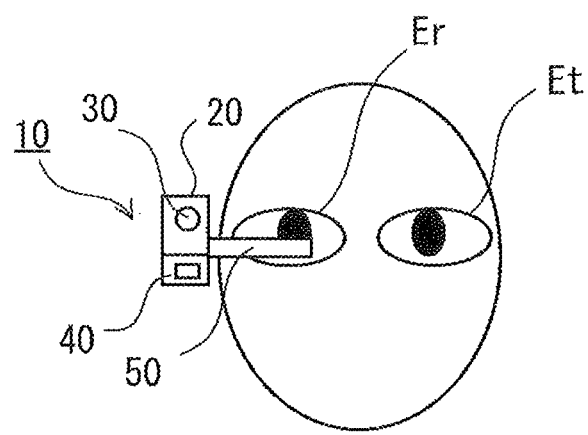
F I G. 3 A

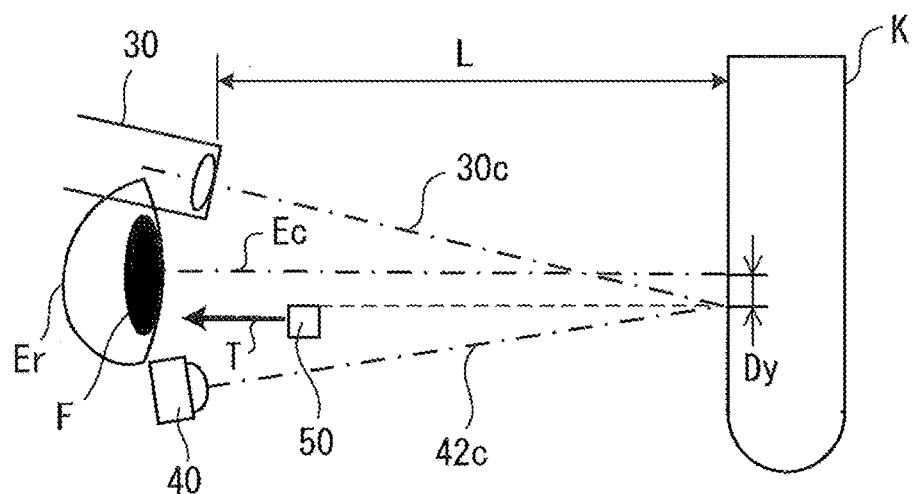
F I G. 6

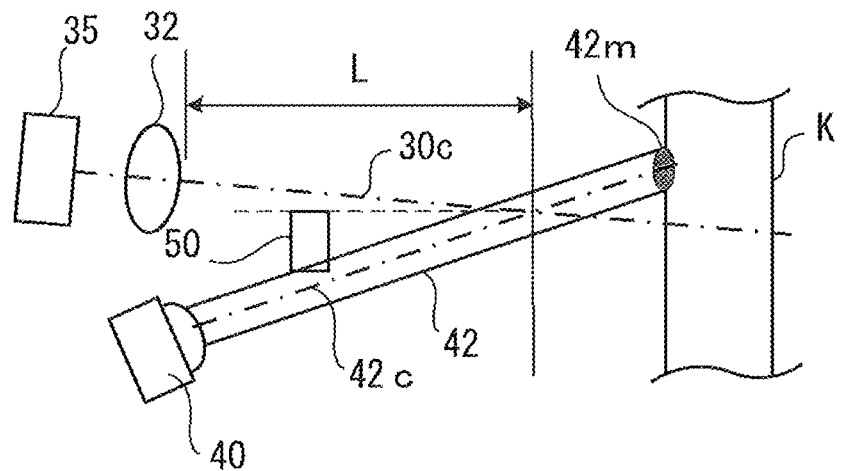
F I G. 8A

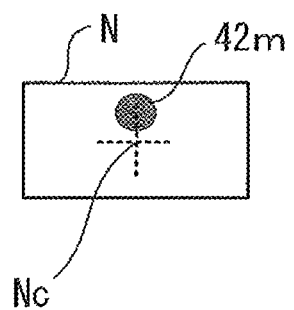
F I G. 8 B

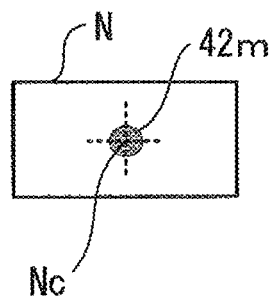
F I G. 9B

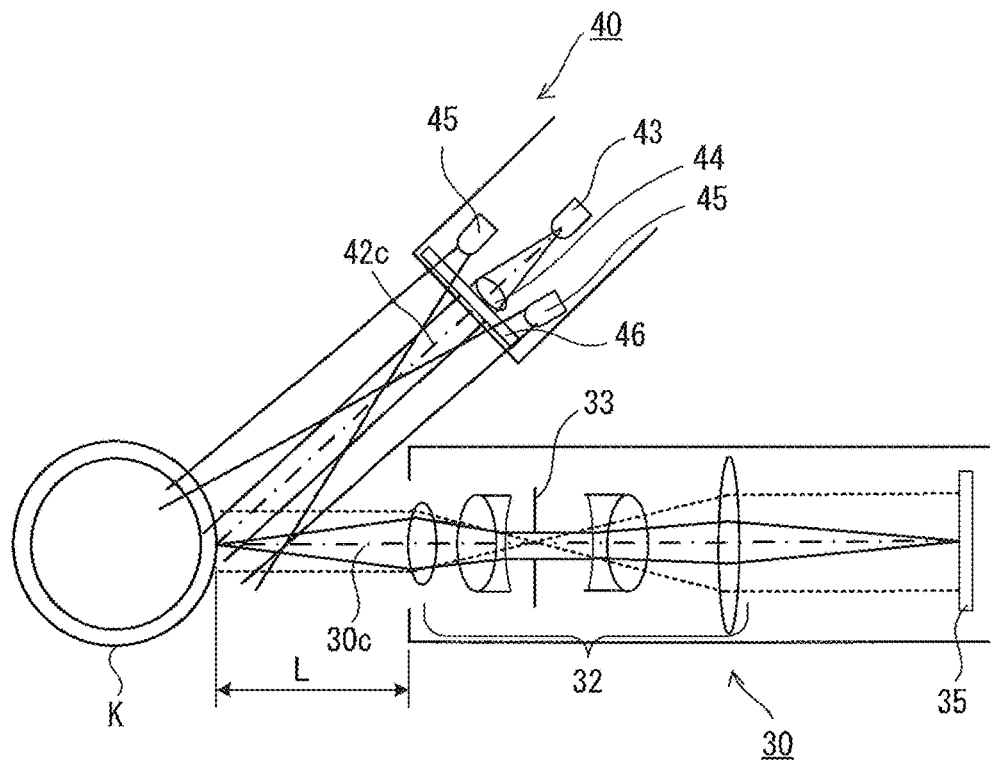
F I G. 11

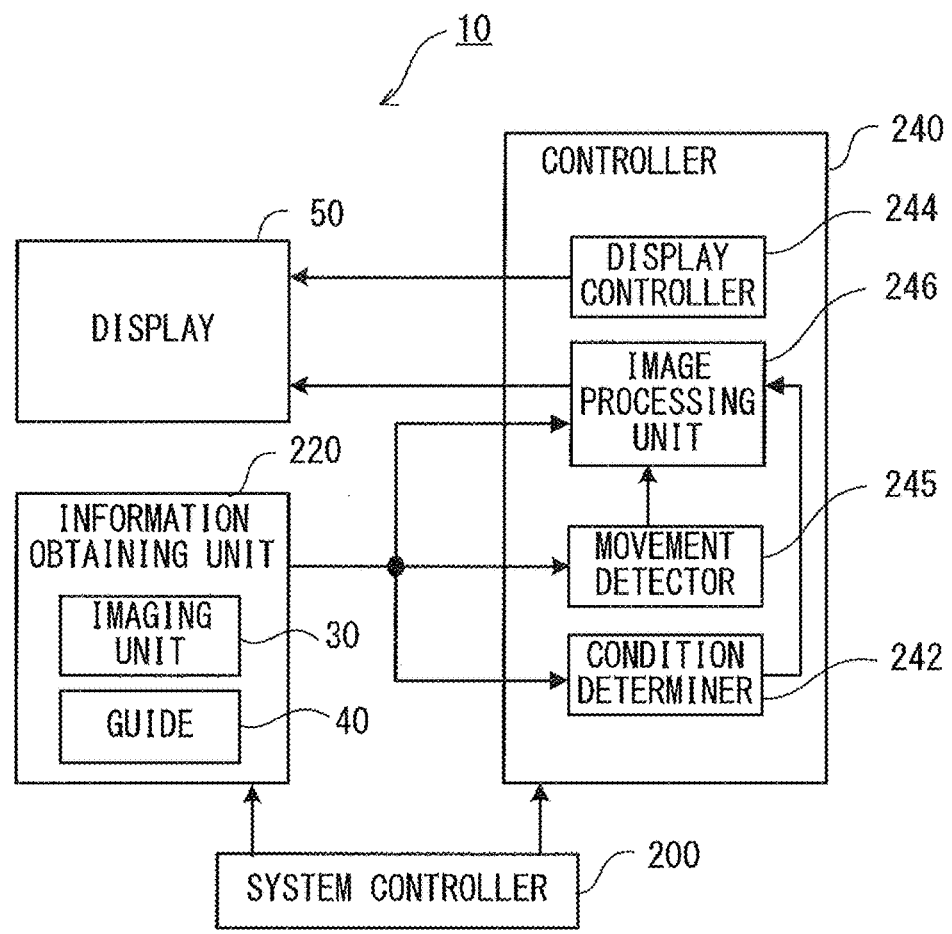
F I G. 14

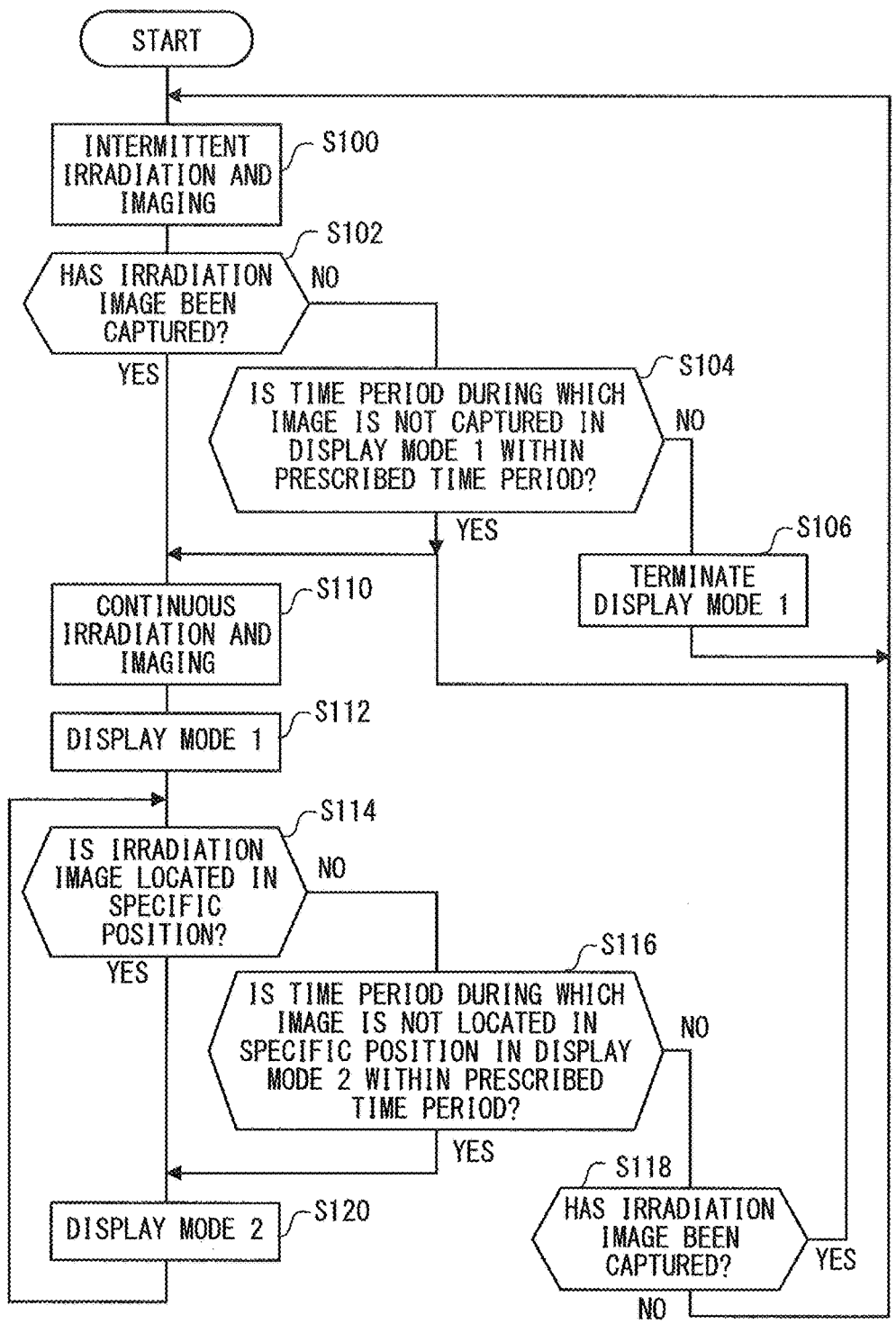
F I G. 1 5

IMAGE OBSERVATION APPARATUS

CROSS-REFERENCE TO RELATED APPLICATIONS

This application is based upon and claims the benefit of priority of the prior Japanese Patent Application No. 2016-166190, filed on Aug. 26, 2016, the entire contents of which are incorporated herein by reference.

BACKGROUND OF THE INVENTION

Field of the Invention

The present invention relates to an image observation apparatus that displays a magnified image in which a specific portion is magnified.

Description of the Related Art

In recent years, spectacle-type image display apparatuses have been actively proposed. As an example, a display apparatus has been proposed that displays a magnified image of a portion of the entire field of view in the portion of the entire field of view (Patent Document 1). In addition, a spectacle-type display apparatus has been proposed that projects an image from an eyepiece device onto a partial area of the pupil, superimposes the image onto an image of the external world, and displays an electronic image in a field of view (Patent Document 2).

[Patent Document 1] Japanese Laid-Open Patent Publication No. 2013-83994

[Patent Document 2] Japanese Laid-Open Patent Publication No. 2009-229676

SUMMARY OF THE INVENTION

An image observation apparatus according to the embodiments includes an imaging unit that images a specimen and obtains a magnified image of the specimen, a display that displays an image, a condition determiner that determines whether a state of the specimen with respect to the imaging unit satisfies a specific condition, and a controller that displays the magnified image obtained by the imaging unit on the display when the condition determiner determines that the specific condition is satisfied.

BRIEF DESCRIPTION OF THE DRAWINGS

FIG. 3A is a front view of an observer who wears an image observation apparatus on the right eye according to the first embodiment.

FIG. 6 is a side view of an image observation apparatus viewed from a right-eye direction according to the first embodiment.

FIG. 8A illustrates a relationship between an optical axis of an imaging unit and guide light in a case in which a specimen is not located at a specific distance from the imaging unit according to the first embodiment.

FIG. 8B illustrates an image captured by an imaging unit in the state of FIG. 8A according to the first embodiment.

FIG. 9B illustrates an image captured by an imaging unit in the state of FIG. 9A according to the first embodiment.

FIG. 11 is a diagram explaining a positional relationship between an imaging unit and a guide in the image observation apparatus of FIG. 10 according to the first embodiment.

FIG. 14 is a block diagram illustrating a specific system configuration of an image observation apparatus according to the first embodiment.

FIG. 15 is a flowchart explaining a procedure of display processing performed by the image observation apparatus of FIG. 14 according to the first embodiment.

DESCRIPTION OF EMBODIMENTS

Embodiments of an image observation apparatus according to the present invention are described below with reference to the drawings. An example in which the image observation apparatus according to the present invention is applied to a spectacle-type image observation apparatus is described below.

Figure 1A:
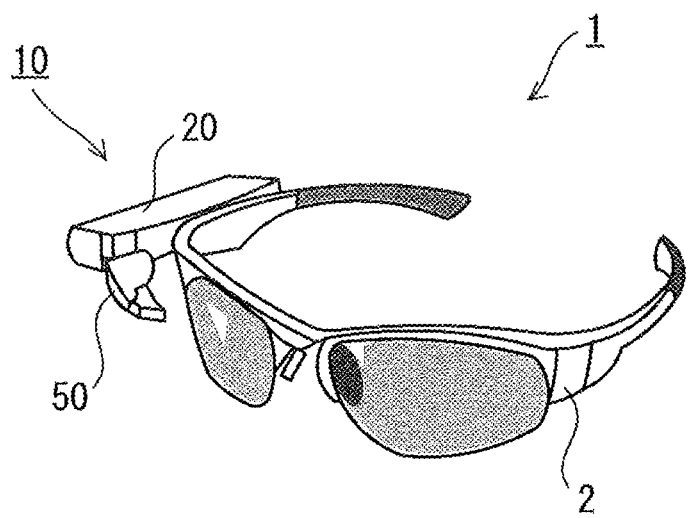
FIG. 1A illustrates an example of the appearance of a wearable image observation apparatus system.

FIG. 1A illustrates an example of a wearable image observation apparatus system 1. In the wearable image observation apparatus system 1, an image observation apparatus 10 is attached to a side portion of spectacles 2. By doing this, an observer can naturally view a display on a display without having a field of view of the external world obstructed in a state in which both hands are freely used. The image observation apparatus 10 can be attached to either a right-hand side or a left-hand side of the spectacles 2.

The image observation apparatus 10 is principally configured by a main body 20 incorporating an imaging unit, a circuit unit and a power source, and a display 50 that displays an image.

Figure 1B:
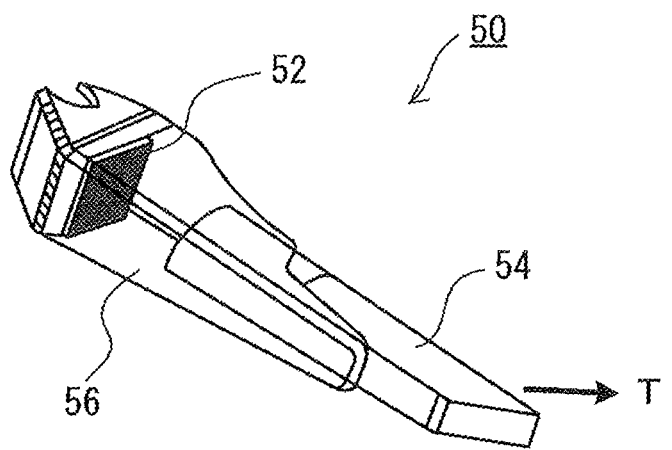
FIG. 1B illustrates an exemplary configuration of a display.

FIG. 1B illustrates an exemplary configuration of the display 50. The display 50 includes a display element 52, a light guide 54, and a cover 56 that protects the light guide 54. The display element 52 forms a display image on the basis of an image captured by the imaging unit. The display element 52 is, for example, an LCD or an organic EL. The display element 52 is also referred to as a display body.

The light guide 54 guides the display image formed by the display element 52 to an end, bends the display image in a perpendicular direction (a T-direction) at the end, and projects the display image onto the eyeball of an observer. The light guide 54 is a transparent member having a rectangular cross section. The observer can magnify and observe a virtual image of the display image formed by the display element 52 as an aerial image.

<First Embodiment>

Figure 2A:
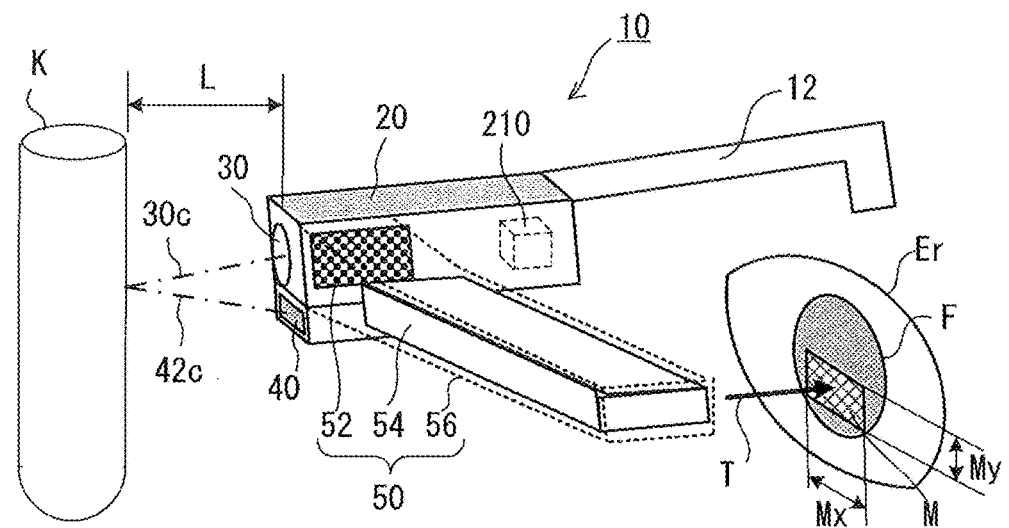
FIG. 2A illustrates a principal configuration of an image observation apparatus and a relationship between a specimen and an observer with respect to the image observation apparatus according to a first embodiment.

FIG. 2A illustrates a principal configuration of the image observation apparatus 10 and a relationship between a specimen K and an observer with respect to the image observation apparatus 10. The specimen K refers to an object to be observed by using the image observation apparatus 10, and the specimen K is, for example, a test tube or a sample or a microorganism in the test tube, or a minute electronic equipment component.

The image observation apparatus 10 includes a guide 40 and a temple 12 in addition to the main body 20 and the display 50 described above. The main body 20 incorporates an imaging unit 30, a circuit unit (not illustrated) that operates the imaging unit 30 and the display 50, a power source 210, and the like. The temple 12 is used to place the image observation apparatus 10 on the ear, and the temple 12 is provided at the rear end of the main body 20.

The imaging unit 30 includes an imaging optical system that magnifies the specimen K and an image sensor that outputs an image signal, and the imaging unit 30 captures a magnified image of the specimen K. The guide 40 is provided below the imaging unit 30 of the main body 20. The guide 40 is used to detect whether a state (the arrangement) of the specimen K with respect to the imaging unit 30 satisfies a specific condition.

The "specific condition" is, for example, that the specimen K is located at a "specific distance" from the imaging unit 30, or that the specimen K is arranged in (at) a "specific orientation (a specific angle)" with respect to the imaging unit 30. This is because, in order to capture an appropriate magnified image, it is requested that the specimen K be located within a focusing range or that the specimen K be arranged in an appropriate orientation with respect to an optical axis of the imaging unit 30. Hereinafter, assume, for example, that the "specific condition" is that the specimen K is located at a "specific distance L", which is a focusing range, from the imaging unit 30.

In observation, it is requested that the specimen K be located at the specific distance L from the imaging unit 30. The guide 40 is attached to the imaging unit 30 in such a way that an optical axis 42c of guide light 42 crosses an optical axis 30c of the imaging optical system in the imaging unit 30 in a position of the specific distance L. A relationship between the imaging unit 30 and the guide 40 will be described with reference to FIG. 5 to FIG. 7.

The display 50 includes the display element 52, the light guide 54, and the cover 56. The display 50 projects a display image M formed by the display element 52 such as a liquid crystal or an organic EL onto a lower portion of the pupil F of the right eye Er (in a T-direction) by using the light guide 54. The display image M is an oblong image having a size within a region of the pupil F, and the display image M is formed by the display element 52 so as to be an oblong image. The width Mx of the display image M projected onto the pupil F is, for example, ⅘ to ½ of the diameter of the pupil F. The height My of the display image M projected onto the pupil F is, for example, ½ to ⅕ of the diameter of the pupil F. The oblong image formed by the display element 52 may be either an image obtained by an oblong image sensor or an oblong image obtained by cutting upper and lower portions from an image having a normal size.

Figure 2B:
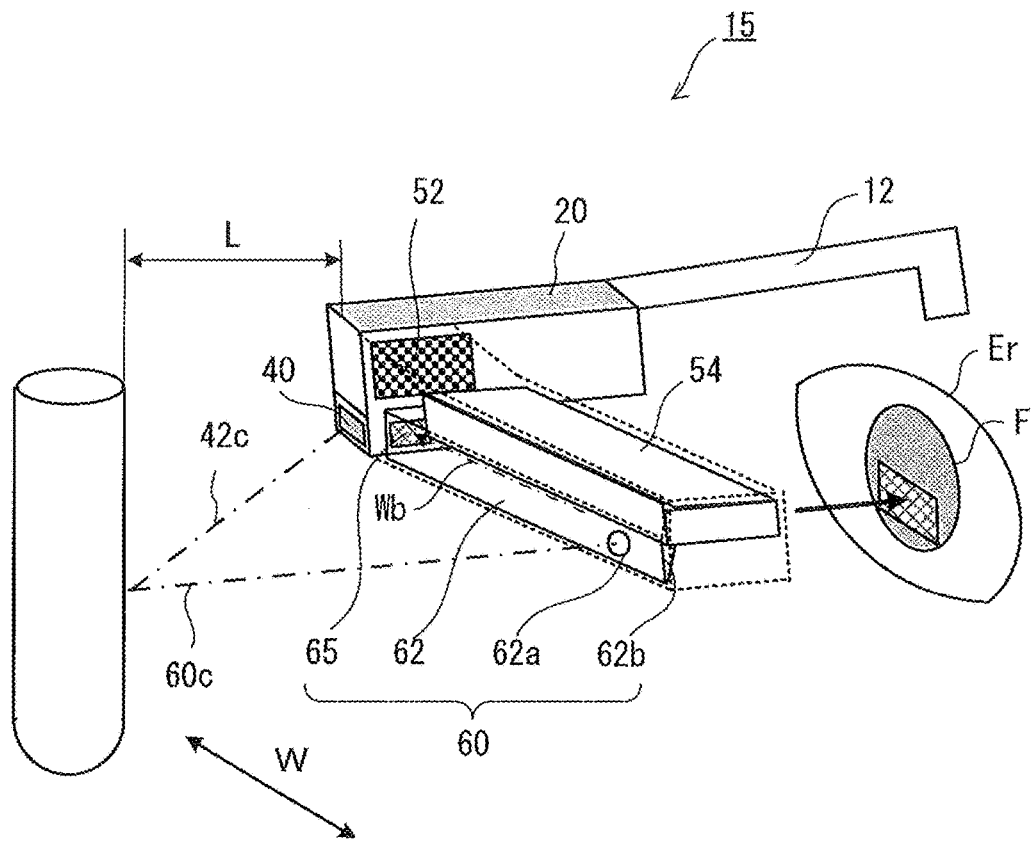
FIG. 2B illustrates a variation of the image observation apparatus of FIG. 2A according to the first embodiment.

In the image observation apparatus 10 described with reference to FIG. 2A, deviation is generated between a direction of the optical axis 30c of the imaging unit 30 and a field of view of the right eye Er (see FIG. 5), and therefore a parallax in a horizontal direction is generated between the display image M and an image of the external world. Accordingly, countermeasures may be taken against the parallax by employing the configuration of an image observation apparatus 15 illustrated in FIG. 2B.

The image observation apparatus 15 includes an imaging unit 60 below the light guide 54 in a direction from the main body 20 toward the inside of a face. The imaging unit 60 includes an imaging optical system 62 that is long in a direction of the width of the face (a W-direction) and an image sensor 65. The imaging optical system 62 is an imaging prism that is long in the W-direction. The image sensor 65 is provided at a root of the imaging optical system 62.

The imaging optical system 62 includes an incident unit 62*a* on which subject light is made incident, near an end. The incident unit 62*a* is provided in a position that substantially corresponds to the position of the pupil F of the right eye Er in the W-direction. The imaging optical system 62 includes a mirror face 62*b* on a side of a rear face of the incident unit 62*a*. The mirror face 62*b* reflects the subject image made incident from the incident unit 62*a* to a direction of the image sensor 65 (a Wb-direction). The imaging optical system 62 forms an image of the subject image reflected by the mirror face 62*b* on the image sensor 65. An image without any parallax (with a small parallax) from an image of the external world of the right eye Er is captured by the image sensor 65.

Figure 3B:
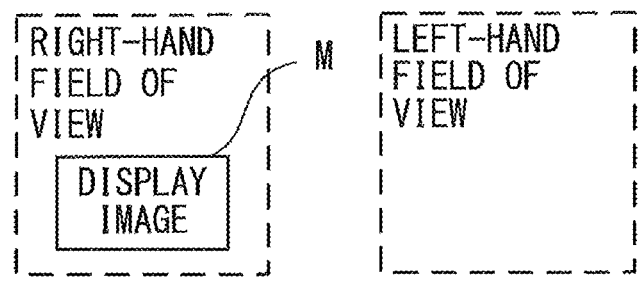
FIG. 3B illustrates right-hand and left-hand fields of view of an observer according to the first embodiment.

FIG. 3A is a front view of an observer who wears the image observation apparatus 10 on the right eye Er. FIG. 3B illustrates right-hand and left-hand fields of view of the observer. A display image M based on a magnified image is projected onto a lower portion of the pupil of the right eye Er of the observer, and therefore the observer observes both a normal image of the external world and the magnified image (the display image M) superimposed onto a lower portion of the normal image of the external world in the right-hand field of view. The observer observes the normal image of the external world in the left-hand field of view.

Figure 4:
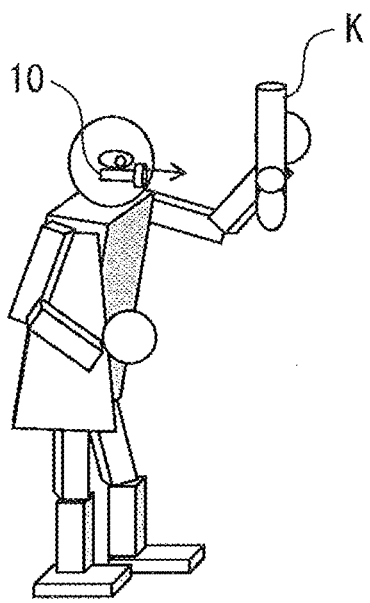
FIG. 4 illustrates an example of an actual use of an image observation apparatus according to the first embodiment.

FIG. 4 illustrates an example of an actual use of the image observation apparatus 10. This example indicates a state in which an observer holds a specimen K in front of the eyes, and observes a magnified image of the specimen K by using the image observation apparatus 10 that the observer wears on the right eye Er.

A positional relationship among the imaging unit 30, the guide 40, and the specimen K in an observation state is described next with reference to FIG. 5 and FIG. 6. Observation is performed in a state in which the specimen K is held in a position of the specific distance L from the imaging unit 30.

Figure 5:
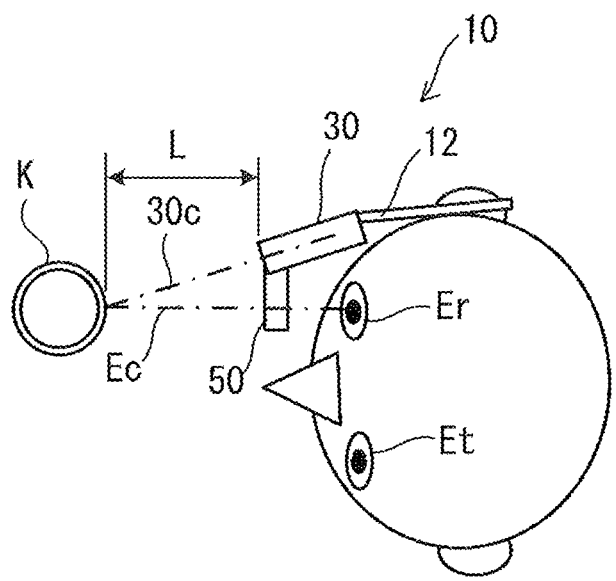
FIG. 5 is a top view of an observer who wears an image observation apparatus according to the first embodiment.

FIG. 5 is a top view of an observer who wears the image observation apparatus 10. The imaging unit 30 is attached in such away that the optical axis 30*c* of the imaging unit 30 faces an obliquely inward direction and the optical axis 30*c* crosses a central line Ec of the right eye Er in a position of the specific distance L. The specific distance L is, for example, within a range of 30 mm to 100 mm.

FIG. 6 is a side view of the image observation apparatus 10 viewed from a right-eye direction. As illustrated in FIG. 6, the imaging unit 30 is attached in such a way that the optical axis 30*c* of the imaging unit 30 faces an obliquely downward direction. Specifically, the imaging unit 30 is attached in such a way that the imaging unit 30 is separated from the specimen K by the specific distance L and that the optical axis 30*c* of the imaging unit 30 crosses the central line Ec of the right eye Er in a position below the center line Ec of the right eye Er by Dy. The guide 40 is attached with respect to the imaging unit 30 in such a way that the optical axis 42*c* of the guide light 42 emitted from the guide 40 crosses the central line Ec of the right eye Er in a position of the specific distance L from the imaging unit 30.

Figure 7:
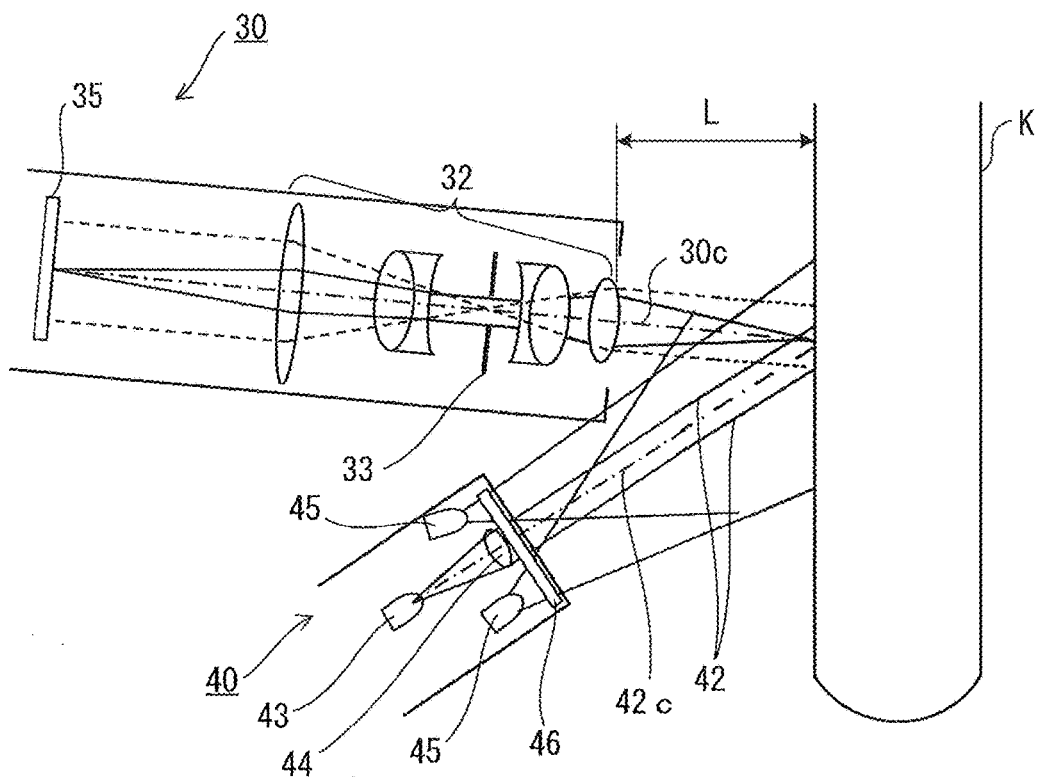
FIG. 7 is a diagram explaining a positional relationship between an imaging unit and a guide and their internal configurations according to the first embodiment.

FIG. 7 is a diagram explaining a positional relationship between the imaging unit 30 and the guide 40 and the internal configurations of the imaging unit 30 and the guide 40. Similarly to FIG. 6, FIG. 7 is a side view of an observation state viewed from the right-eye direction. The imaging unit 30 includes an imaging optical system 32 that forms a subject image and an image sensor 35 that performs photoelectric conversion on an image formed by the imaging optical system 32. The image sensor 35 is, for example, a charge coupled device (CCD) or a complementary metal oxide semiconductor (CMOS) element.

The imaging optical system 32 is an optical system that is telecentric on both a side of a subject (the subject K) and a side of the image sensor 35. By configuring the imaging optical system 32 as described above, the size of an image on an imaging plane can be prevented from changing even when the position of the subject moves slightly back and forth.

In addition, the imaging optical system 32 is a magnification projection optical system for which an image-forming magnification is greater than 1. By employing the magnification projection optical system, an electronic image of a subject observed via an observation optical system can be magnified, and can be observed with a high definition. Of course, by employing an equal-magnification projection optical system or a reduction projection optical system, rather than the magnification projection optical system, as the imaging optical system 32, a portion of an imaging region may be magnified by using an electronic zoom such that a magnified image is generated.

Further, the imaging optical system 32 includes an aperture diaphragm 33 for which the size of an aperture is variable. The imaging optical system 32 can change a depth of field by changing the size of the aperture of the aperture diaphragm 33. A change in brightness due to a change in the aperture diaphragm 33 may be corrected by adjusting an amount of light on an illumination side, as described later, may be corrected by adjusting a gain of the image sensor 35, or may be corrected by adjusting the brightness of the display element 52.

The imaging optical system 32 may be fixed integrally with the imaging unit 30, or a group of some lenses may be configured as a wobbling group and a focusing group so as to perform auto-focusing.

Alternatively, the imaging unit 30 may be configured so as to perform focusing by integrally moving the imaging optical system 32 (so-called entire extending). By integrally moving the imaging optical system 32, the imaging optical system 32 is maintained in a telecentric state on both a side of the specimen and a side of the image sensor, and therefore the size of an image can be prevented from changing due to focusing. In a case in which an auto-focusing function is installed, the imaging optical system 32 includes a mechanism for moving a lens (not illustrated), and the imaging unit includes a lens drive unit and a controller (not illustrated).

The guide 40 includes a guide LED 43, a guide lens 44, an illumination LED 45, and a diffusion plate 46. The guide LED 43 irradiates the subject K with the spot-shaped guide light 42. The guide LED 43 is, for example, a red light-emitting element.

The guide lens 44 is, for example, a positive lens, and converges irradiation light emitted from the guide LED 43 as the guide light 42 on an exit side. The guide light 42 that passes through an exit window (not illustrated) of the guide 40 forms an irradiation image 42*m* (not illustrated) indicating an index of positioning on the specimen K. The irradiation image 42*m* is captured by the imaging unit 30.

The illumination LED 45 is, for example, an LED that emits white light, and the illumination LED 45 illuminates the specimen K. The diffusion plate 46 principally diffuses illumination light, and the diffusion plate 46 is provided in the exit window (not illustrated). When it is determined that the specimen K is located at the specific distance L, the irradiation of the guide LED 43 is stopped, the illumination LED 45 emits light, and the specimen K is illuminated. The guide LED 43 is also referred to as a first light emitter, and the illumination LED 45 is also referred to as a second light emitter.

Figure 8C:
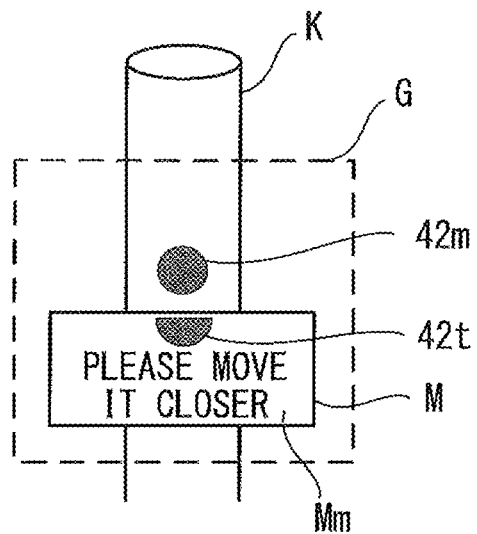
FIG. 8C illustrates an example of a guide screen in the state of FIG. 8A according to the first embodiment.

FIG. 8A to FIG. 9D are diagrams explaining a guide display that guides the alignment of the specimen K. The guide display guides an observer such that the observer can easily align the specimen K. FIG. 8A to FIG. 8C illustrate a case in which the specimen K is not located at the specific distance L from the imaging unit 30. FIG. 8A illustrates a relationship between the optical axis 30c of the imaging unit 30 and the guide light 42 in a case in which the specimen K is not located at the specific distance L. FIG. 8A illustrates a case in which the specimen K is located in a position farther than the specific distance L from the imaging unit 30.

The guide light 42 emitted from the guide LED 43 of the guide 40 forms an irradiation image 42m in a position above a position in which the guide light 42 crosses the optical axis 30c of the imaging unit 30. FIG. 8B illustrates a captured image N obtained by the imaging unit 30 in the state of FIG. 8A. The irradiation image 42m is captured in a position above the center Nc of a screen. In the captured images N, the position of the irradiation image 42m is detected. In the captured image N of FIG. 8B, the irradiation image 42m is detected in a position that is separated from the center Nc of the screen by a certain distance or more. It is determined from the position of the irradiation image 42m detected in the captured image N that the specimen K is located in a position farther than the specific distance L.

FIG. 8C illustrates an example of a guide screen in the state of the FIG. 8A. A corresponding guide screen is generated according to the position of the irradiation image 42m on the captured image N. The generated guide screen is displayed as a display image M. In a field of view G of the right eye of an observer, an actual image of the external world and the display image M superimposed onto a portion of the image of the external world are displayed. The irradiation image 42m of FIG. 8C is an image that is actually formed on the specimen K.

A guide screen that prompts the movement of the specimen K by the specific distance L is displayed as the display image M in a lower portion of the field of view G. In the display image M, which is a guide screen, a guide message Mm indicating an instruction to move the specimen K closer is displayed. In an upper portion of a screen of the display image M, a semicircular index image 42t is displayed. The semicircular index image 42t is a mark that indicates deviation in the position of the specimen K from the specific distance L by using a relative position with respect to the irradiation image 42m. The index image 42t is generated by extracting the irradiation image 42m on the captured image N. When the specimen K is moved in a direction approaching the imaging unit 30, an actual irradiation image 42m moves downward, and approaches the index image 42t.

Figure 9A:
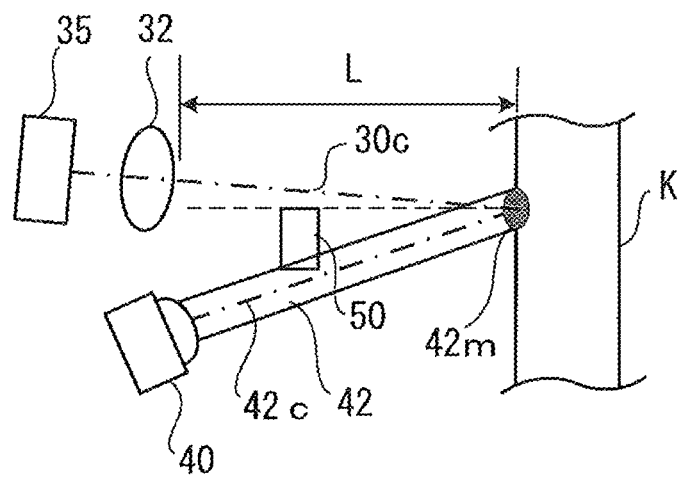
FIG. 9A illustrates a relationship between an optical axis of an imaging unit and guide light in a case in which a specimen is located at a specific distance from the imaging unit according to the first embodiment.
Figure 9C:
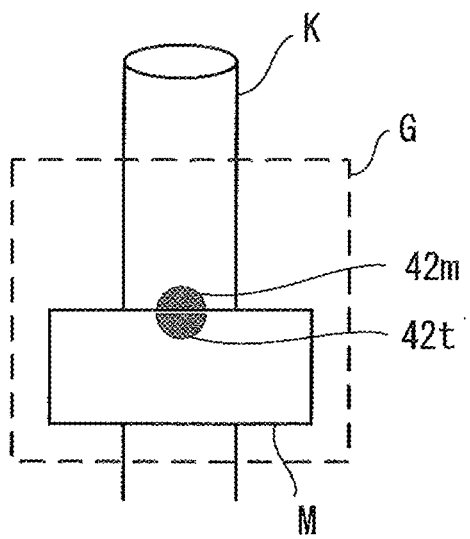
FIG. 9C illustrates an example of a guide screen in the state of FIG. 9A according to the first embodiment.
Figure 9D:
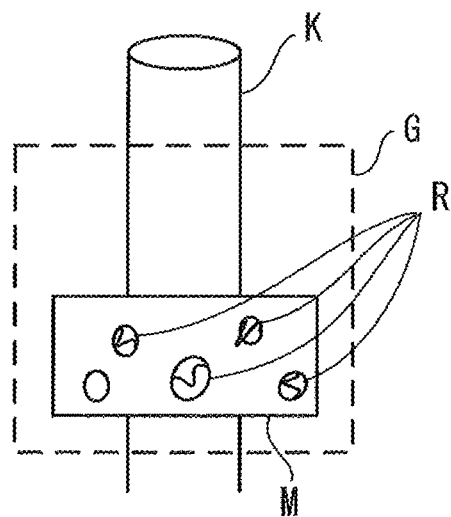
FIG. 9D illustrates an example in which a magnified image is displayed as a display image according to the first embodiment.

In this example, assume that, in a state in which it is determined that the position of the specimen K has deviated, only the guide screen is displayed as the display image M, and a magnified image illustrated in FIG. 9D is not displayed. This is to clearly indicate that the position of the specimen K is deviated from the specific distance L. Even in a state in which it is determined that the position of the specimen K is deviated from the specific distance L, a magnified image may be displayed as the display image M, and the guide message Mm or the like may be superimposed onto the magnified image.

FIG. 9A to FIG. 9D illustrate a case in which the specimen K is located at the specific distance L from the imaging unit 30. FIG. 9A illustrates a relationship between the optical axis 30c of the imaging unit 30 and the guide light 42 in a case in which the specimen K is located at the specific distance L.

FIG. 9B illustrates a captured image N obtained by the imaging unit 30 in the state of FIG. 9A. In a case in which the specimen K is located at the specific distance L, the irradiation image 42m is captured in a position of the center Nc of a screen. The position of the captured irradiation image 42m is detected on the captured image N. When it is determined that the position of the irradiation image 42m is the center Nc of the screen, a guide screen indicating that the specimen K is located at the specific distance L is generated. The generated guide screen is displayed as the display image M.

FIG. 9C illustrates an example of a guide screen in the state of FIG. 9A. One circle is generated by combining the upper half of a circle indicating the actually formed irradiation image 42m with a lower semicircle indicating the index image 42t. After the guide screen of FIG. 9C is displayed for a short time (for example, one second), a magnified image is displayed as the display image M. As the display image M, minute objects R in the specimen K are magnified and displayed, for example, as illustrated in FIG. 9D.

Figure 10:
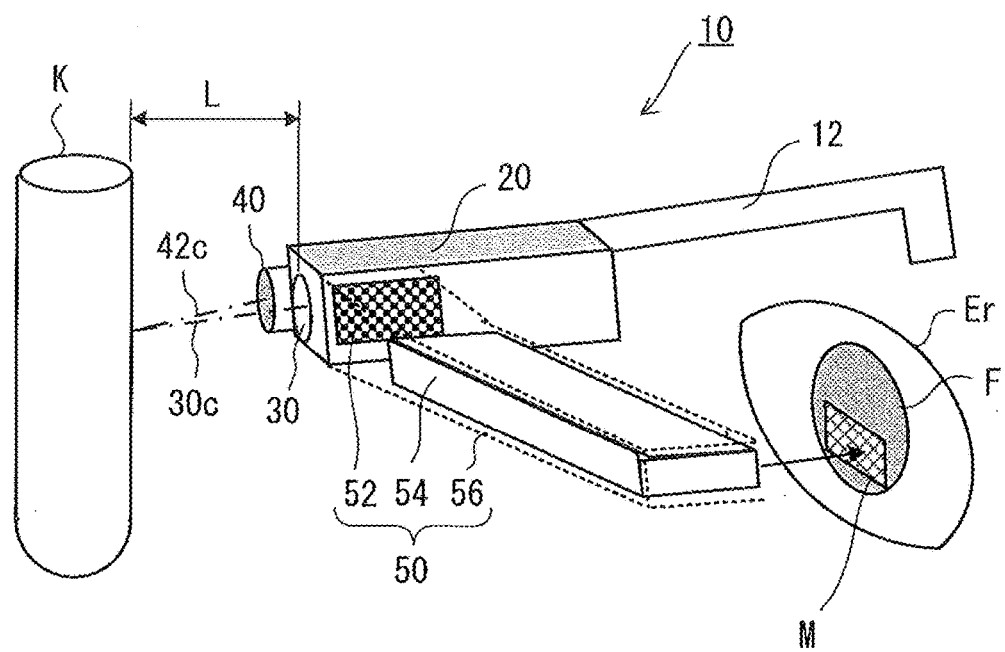
FIG. 10 illustrates the appearance of an image observation apparatus that is provided with a guide in a lateral position of an imaging unit according to the first embodiment.

In the image observation apparatus 10 described above, the guide 40 is provided below the imaging unit 30, but the image observation apparatus 10 is not limited to this. FIG. 10 illustrates the appearance of an image observation apparatus 10 in which a guide 40 is provided in a side portion of the imaging unit 30. The guide 40 is provided in the main body 20 in such a way that the optical axis 42c of the guide light 42 crosses the optical axis 30c of the imaging unit 30 in a position of the specific distance L. FIG. 11 is a diagram explaining a positional relationship between the imaging unit 30 and the guide 40 in the image observation apparatus 10 of FIG. 10. Similarly to FIG. 5, FIG. 11 is a top view of an observation state.

Figure 12:
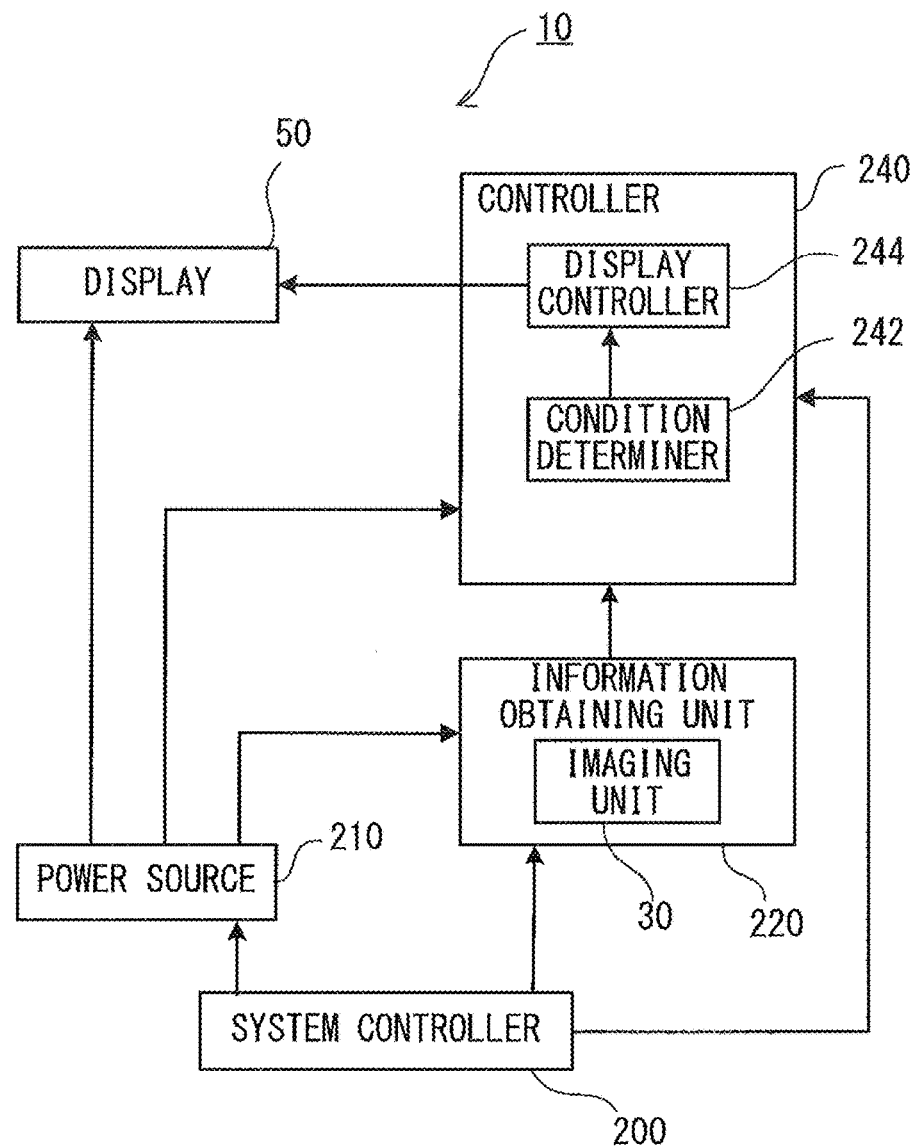
FIG. 12 is a block diagram illustrating a basic system configuration of an image observation apparatus according to the first embodiment.

A system configuration of the image observation apparatus 10 is described next. FIG. 12 is a block diagram illustrating a basic system configuration of the image observation apparatus 10. The image observation apparatus 10 includes a display 50, a system controller 200, a power source 210, an information obtaining unit 220, and a controller 240.

The system controller 200 controls the entirety of the image observation apparatus 10. The power source 210 includes a battery, and supplies power to respective units of the image observation apparatus 10. The information obtaining unit 220 obtains a captured image for image observation, information for determining a condition by using the condition determiner 242 described later, sound information that assists image observation, or the like. The information obtaining unit 220 includes an imaging unit 30. The imaging unit 30 images a specimen K, and obtains a magnified image of the specimen K, as described above.

The controller 240 includes a condition determiner 242 and a display controller 244. The controller 240 controls a display of the magnified image obtained by the imaging unit 30 on the display 50 in accordance with the determination of the condition determiner 242. The condition determiner 242 determines whether a state of the specimen K with respect to the imaging unit 30 satisfies the specific condition described above. The display controller 244 controls the display 50, and projects the magnified image obtained by the imaging unit 30 as a display image M onto a portion of the pupil of an observer.

The image observation apparatus 10 includes a CPU (not illustrated) and a non-volatile storage (not illustrated) that stores a control program. The system controller 200 is implemented by software processing performed by executing the control program by using the CPU that reads the control program. The information obtaining unit 220 and the controller 240 may be implemented by software processing performed by the CPU, or may be implemented by hardware such as a gate array.

Specifically, when the condition determiner 242 determines that the specific condition is satisfied, the controller 240 displays the magnified image obtained by the imaging unit 30 (see FIG. 9C) on the display 50. By doing this, when the state of the specimen K with respect to the imaging unit 30 satisfies the specific condition, an observer can observe an aerial image that is a virtual image of the display image M as a magnified image in a portion of an actual image of the external world. When the specified condition is not satisfied, a guide screen, as illustrated in FIG. 8C, is displayed to the observer.

Figure 13:
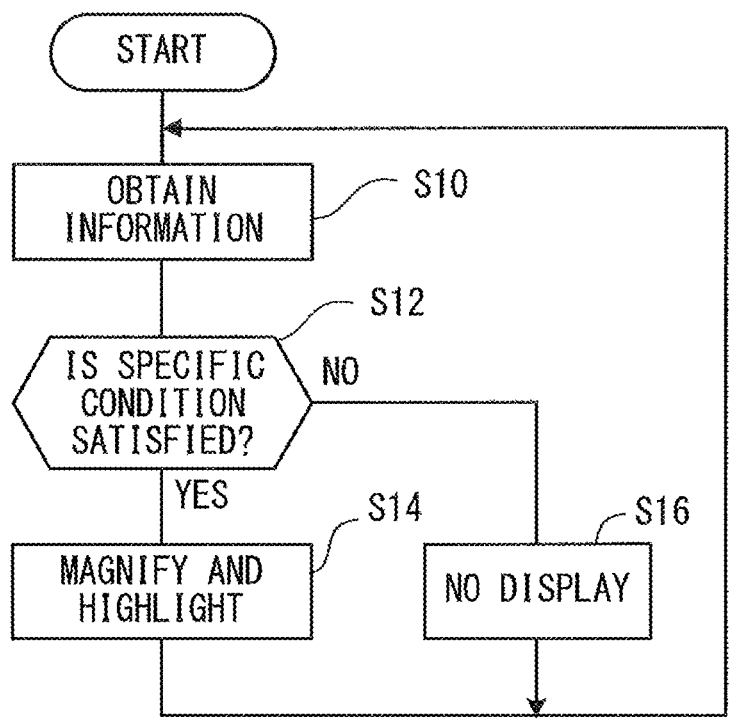
FIG. 13 is a flowchart explaining a procedure of display processing performed by an image observation apparatus according to the first embodiment.

FIG. 13 is a flowchart explaining a procedure of display processing performed by the image observation apparatus 10 described with reference to FIG. 12.

The information obtaining unit 220 obtains image information (imaging information) from the imaging unit 30 (step S10). The condition determiner 242 determines whether a state of the specimen K with respect to the imaging unit 30 satisfies a specific condition in accordance with the obtained image information (step S12). When the condition determiner 242 determines that the state satisfies the specific condition (YES in step S12), the display controller 244 displays a magnified image obtained by the imaging unit 30 with no change or with emphasis on the display 50 (step S14). When the condition determiner 242 determines that the state does not satisfy the specific condition (NO in step S12), the display controller 244 does not display the magnified image on the display 50 (step S16). In this case, the display controller 244 displays a guide message Mm, as illustrated in FIG. 8C, instead of the magnified image as a display image M.

A more specific configuration than the configuration of the image observation apparatus 10 described with reference to FIG. 12 is described next. FIG. 14 is a block diagram illustrating a specific system configuration of the image observation apparatus 10. The image observation apparatus 10 includes a display 50, a system controller 200, an information obtaining unit 220, and a controller 240. A power source 210 is omitted.

The information obtaining unit 220 includes a guide 40 in addition to an imaging unit 30. The controller 240 includes a movement detector 245 and an image processing unit 246 in addition to a condition determiner 242 and a display controller 244. The imaging unit 30, the display 50, the system controller 200, and the display controller 244 are as described above with reference to FIG. 12, and the description thereof is omitted.

The guide 40 detects whether the specimen K is located at a specific distance L from the imaging unit 30. As described above with reference to FIG. 7 and the like, the guide 40 includes a guide LED 43 and an illumination LED 45. In the guide LED 43 and the illumination LED 45, the ON/OFF state or an amount of light is controlled by the system controller 200.

The condition determiner 242 determines whether the specimen K is located at the specific distance L from the imaging unit 30. When the condition determiner 242 determines that the specimen K is located at the specific distance L, the condition determiner 242 determines that "the specific condition is satisfied".

Specifically, first, the condition determiner 242 processes a captured image N, and determines whether an irradiation image 42m has been captured. Assume that the guide LED 43 is a red-light LED. When an image exists in which a red component is strong and that has a certain area or more, the condition determiner 242 regards the image as the irradiation image 42m. After the condition determiner 242 determines that the irradiation image 42m has been captured, the condition determiner 242 determines whether the position of the irradiation image 42m is within a prescribed range from the center of the captured image N. When the irradiation image 42m is located within the prescribed range, the condition determiner 242 determines that the specific condition is satisfied.

The movement detector 245 analyzes the captured image obtained by the imaging unit 30, and detects the movement of a subject. In this example, the movement detector 245 recognizes and extracts the shape of the specimen K from the captured image, and calculates the movement of the specimen K generated by an observer. The movement detector 245 detects the type of the movement of the specimen K from the speed and direction of the movement of the specimen K, and reports the detected type of the movement to the image processing unit 246. Examples of the type of the movement of the specimen K include a rotation around a vertical axis, a swing in a horizontal direction, a movement in the horizontal direction, and a movement in a vertical direction.

The image processing unit 246 performs gamma (γ) correction, white balance (WB) correction, or the like on the captured image obtained by the imaging unit 30. The image processing unit 246 also generates a guide screen, as illustrated in FIG. 8C or FIG. 9C, in accordance with the determination of the condition determiner 242. Further, when the condition determiner 242 determines that the specific condition is satisfied, the image processing unit 246 generates a magnified image, as illustrated in FIG. 9D.

In addition, the image processing unit 246 performs special image processing on an image of the specimen K according to the type of the movement of the specimen K detected by the movement detector 245. As an example, the image processing unit 246 extracts a portion of the magnified image, and performs a process for continuously changing the form of the extracted portion of the image. Details of the special image processing performed on the image of the specimen K according to the type of the movement of the specimen K will be described later. The image processing unit 246 performs the special image processing when an observer previously selects a special image processing mode.

The image processing unit 246 may perform the special image processing according to an instruction from the observer other than the movement of the specimen K. Examples of the other instruction include the detection of a tap operation that is performed on the main body 20 by the observer by using a finger in a case in which a vibration sensor is provided in the main body 20 of the image observation apparatus 10.

FIG. 15 is a flowchart explaining a procedure of display processing performed by the image observation apparatus 10 described with reference to FIG. 14. The system controller 200 controls the imaging unit 30 and the guide 40 of the information obtaining unit 220, the condition determiner 242, the display controller 244, the movement detector 245, and the image processing unit 246 of the controller 240, and the like such that the processing below is performed.

First, the guide 40 intermittently emits the guide light 42, and the imaging unit 30 captures an image in synchronization with the intermittent light emission (step S100). The condition determiner 242 determines whether the irradiation image 42m has been captured (step S102). This is because, when the position of the specimen K is greatly deviated from the imaging unit 30, the irradiation image 42m is not captured. When the guide LED 43 is a red-light LED, the condition determiner 242 determines whether an image in which a red component is strong and that has a certain area or more exists in a captured image N.

When the condition determiner 242 determines that the irradiation image 42m has been captured (YES in step S102), the guide 40 continuously emits the guide light 42, and the imaging unit 30 captures an image (step S110).

The controller 240 turns on the display 50, and executes display mode 1 (step S112). Display mode 1 is a mode for displaying a guide screen on the display 50, as illustrated in FIG. 8C and FIG. 9C. Display mode 1 is also referred to as a first display mode.

Return now to step S102. When the condition determiner 242 determines that the irradiation image 42m has not been captured (NO in step S102), the condition determiner 242 determines whether a time period during which the irradiation image 42m is not captured in display mode 1 is within a prescribed time period (step S104). When the condition determiner 242 determines that the time period during which the irradiation image 42m is not captured in display mode 1 is within the prescribed time period (for example, three seconds) (YES, in step S104), the processing returns to step S110, and continuous irradiation and imaging are continued. Namely, when the position of the specimen K deviates for a short time, display mode 1 is not terminated. This is because, when display mode 1 is terminated every time deviation in the position of the specimen K is generated for a short time, the commencement and termination of display mode 1 are frequently repeated, and flickering of a screen is generated.

When the condition determiner 242 determines that the time period during which the irradiation image 42m is not captured in display mode 1 is not within the prescribed time period (NO in step S104), the controller 240 turns off the display 50, and terminates display mode 1 (step S106), and the processing returns to step S100. This is to cancel continuous irradiation, and to prevent the consumption of a battery, when a large deviation in the position of the specimen K is continued during the prescribed time period or more. The condition determiner 242 determines NO in step S104 in a state in which display mode 1 is OFF, the processing returns to step S100, and intermittent irradiation and imaging are continued.

The condition determiner 242 determines whether the irradiation image 42m is located in a specific position in display mode 1 (step S114). The specific position is a position of the center Nc of the captured image N, as described with reference to FIG. 9C. When the condition determiner 242 determines that the irradiation image 42m is located in the specific position (YES in step S114), the controller 240 switches from display mode 1 to display mode 2 (step S120). Display mode 2 is a mode for displaying a magnified image as the display image M on the display 50, as illustrated in FIG. 9D. In display mode 2, the illumination LED 45 is also turned on. Display mode 2 is also referred to as a second display mode. The processing of the controller 240 returns to step S114 after step S120.

When the condition determiner 242 determines that the irradiation image 42m is not located in the specific position (NO in step S114), the condition determiner 242 determines whether a time period during which the irradiation image 42m is not located in the specific position in display mode 2 is within a prescribed time period (for example, three seconds) (step S116). When the condition determiner 242 determines that the time period during which the irradiation image 42m is not located in the specific position in display mode 2 is within the prescribed time period (YES in step S116), the processing moves on to step S120, and display mode 2 is continued. Similarly to step S104, this is to prevent a screen from flickering.

When the condition determiner 242 determines that the time period during which the irradiation image 42m is not located in the specific position in display mode 2 is not within the prescribed time period (NO in step S116), the condition determiner 242 determines whether the irradiation image 42m has been captured (step S118). When the condition determiner 242 determines that the irradiation image 42m has not been captured (NO in step S118), display mode 2 is terminated, and the processing returns to step S100. This is because it is determined that the position of the specimen K has greatly deviated.

When the condition determiner 242 determines that the irradiation image 42m has been captured (YES in step S118), the processing moves on to step S110. The controller 240 switches from display mode 2 to display mode 1. In addition, the illumination LED 45 is turned off.

Special image processing performed by the image observation apparatus 10 is described next. As described above, the image processing unit 246 performs special image processing on minute objects R included in the specimen K according to the type of the movement of the specimen K generated by an observer that has been detected by the movement detector 245. The minute object R is a cell or a particle. A specific example of the special image processing is described with reference to FIG. 16A to FIG. 18C.

Figure 16A:
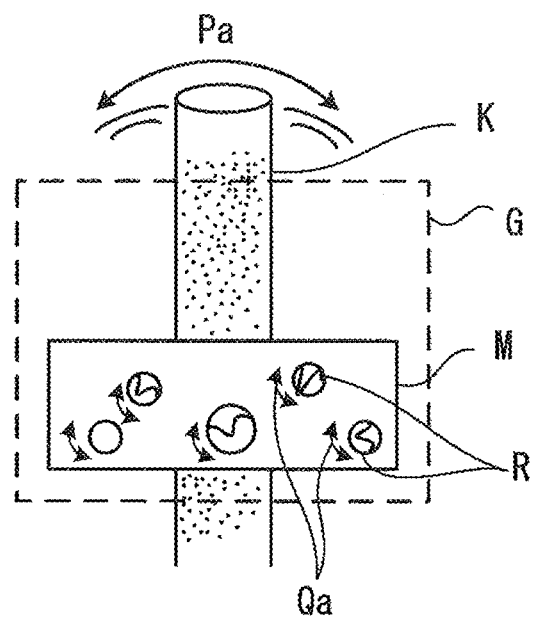
FIG. 16A illustrates display example 1 of an animation of minute objects according to the first embodiment.

FIG. 16A illustrates display example 1 of an animation of the minute objects R. When the movement detector 245 detects a movement (in a Pa-direction) of the specimen K such that a pendulum swings on a plane parallel to a field of view G, the image processing unit 246 performs image processing for rotating the minute objects R (in a Qa-direction) in the form of an animation.

Specifically, the image processing unit 246 extracts images of the minute objects R from the captured image N, rotates the extracted images of the minute objects R by a prescribed angle, and generates rotated images. The image processing unit 246 combines the rotated images with the captured image N, and generates a combined image. The image processing unit 246 continuously generates a combined image. Consequently, a display image M in which the minute objects R are rotating is displayed. A rotation direction (a rightward rotation or a leftward rotation) of the minute objects R may be alternatively switched at specified time intervals.

Figure 16B:
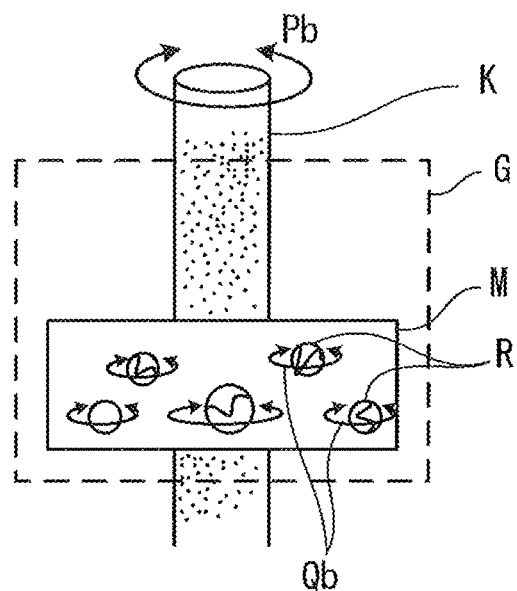
FIG. 16B illustrates display example 2 of an animation of minute objects according to the first embodiment.

FIG. 16B illustrates display example 2 of an animation of the minute objects R. When the movement detector 245 detects a movement in which the specimen K is rotated (in a Pb-direction) with a vertical direction as a center, as the movement of the specimen K, the image processing unit 246 performs image processing for three-dimensionally rotating the minute objects R (in a Qb-direction).

Specifically, the image processing unit 246 extracts images of the minute objects R from the captured image N. The image processing unit 246 performs a process for moving left-hand portions of the extracted minute objects R to a right-hand side or a process for moving right-hand portions to a left-hand side, and generates an image of the minute objects R as if they were rotating. The image processing unit 246 combines the generated image indicating that the minute objects R are rotating with the captured image N so as to generate a combined image. By doing this, a display image M in which the minute objects R are three-dimensionally rotating is displayed. A rotation direction (Qb) of the minute objects R may match a rotation direction (Pb) of the specimen K, or may be alternatively switched at specified time intervals.

In the image processing described above, by performing a simple operation on a specimen K, an observer can not only magnify and observe minute objects R within the specimen K, but can also be entertained as if the observer is watching an animation.

Further, the image processing unit 246 may display a scale indicating the size of a minute object R as a display image M, may display a result of counting the number of minute objects R, or may display an auxiliary display in a virtual reality, in addition to simple magnified images of the minute objects R.

Floating minute objects R may fail to be distinguished from each other. Accordingly, the image processing unit 246 may include a similar image determination function (not illustrated) for individually specifying a plurality of minute objects R. By using the similar image determination function, the image processing unit 246 may determine and display a change in respective portions or respective elements of the minute objects R at specified time intervals. In addition, the image processing unit 246 may display the movement loci of the minute objects R, or may name and display the minute objects R. Further, the image processing unit 246 may color-code and display respective portions of the minute objects R, or may perform image processing on specific portions of the minute objects R and may perform highlighting.

Figure 17A:
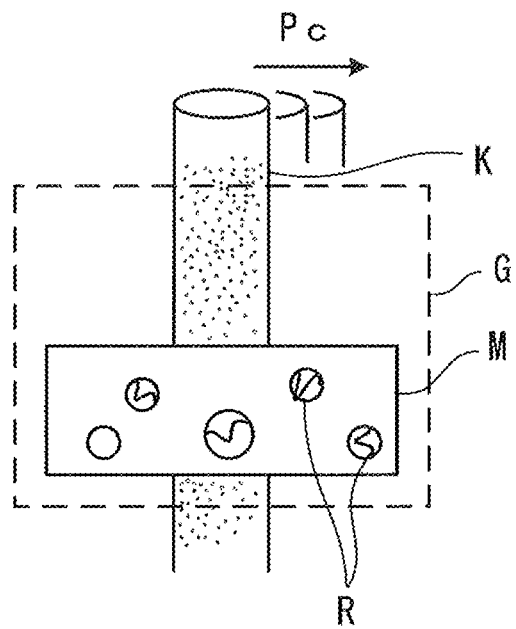
FIG. 17A illustrates a state before the hue of minute objects changes according to the first embodiment.
Figure 17B:
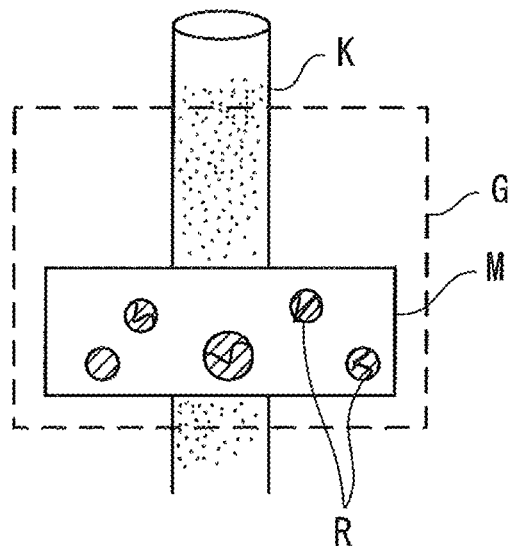
FIG. 17B illustrates a state after the hue of minute objects has changed according to the first embodiment.
Figure 17C:
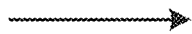
FIG. 17C illustrates a hue bar according to the first embodiment.

FIG. 17A to FIG. 17C are diagrams explaining that the hue of the minute objects R is changed according to a horizontal movement of the specimen K. When the movement detector 245 detects that the specimen K has been moved horizontally (in a Pc-direction), the image processing unit 246 changes the hue of the minute objects R. FIG. 17A illustrates a state before the hue of the minute objects R changes, and FIG. 17B illustrates a state after the hue of the minute objects R has changed.

The image processing unit 246 may determine a change in hue according to, for example, a hue bar illustrated in FIG. 17C. Specifically, the image processing unit 246 may change the hue of the minute objects R to either of colors on a right-hand side and a left-hand side in the hue bar in accordance with the direction of the horizontal movement (in the Pc-direction). In this case, as an example, when a current color of the minute objects R is blue and a movement in a rightward direction of the specimen K has been detected, the image processing unit 246 changes the hue of the minute objects R from blue to blue green.

In the image processing described above, the hue of the minute objects R can be easily changed by performing a simple operation on the specimen K. Even in a case in which it is difficult to distinguish the minute objects R from a background in an actual display, the minute objects R can be highlighted by changing the hue of the minute objects R. An effect similar to the effect of an observation method of a microscope for distinguishing cells by dyeing the cells can be obtained.

Figure 18A:
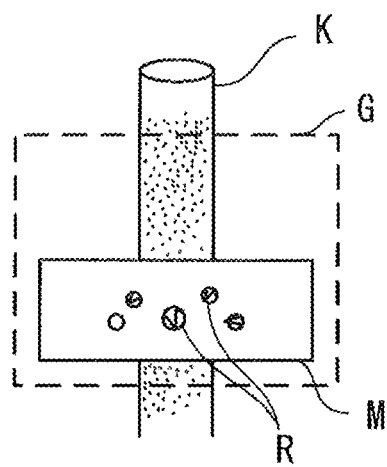
FIG. 18A is a diagram explaining a process for changing a magnification ratio of minute objects according to a vertical movement of a specimen according to the first embodiment.
Figure 18B:
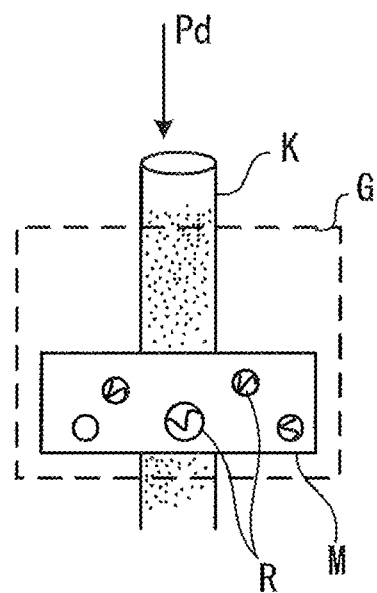
FIG. 18B is a diagram explaining a process for changing a magnification ratio of minute objects according to a vertical movement of a specimen according to the first embodiment.
Figure 18C:
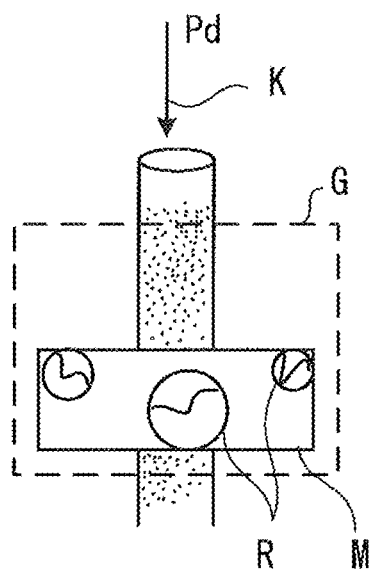
FIG. 18C is a diagram explaining a process for changing a magnification ratio of minute objects according to a vertical movement of a specimen according to the first embodiment.

FIG. 18A to FIG. 18C are diagrams explaining a process for changing a magnification ratio of minute objects R according to a vertical movement of the specimen K generated by an observer. When the movement detector 245 detects that the specimen K has been vertically moved, the image processing unit 246 changes the size of the minute objects R. Specifically, the image processing unit 246 generates a magnified image of an appropriate magnification by performing known electronic zoom processing on a captured image.

FIG. 18A illustrates a normal display image M. When an observer moves the specimen K in a downward direction (in a Pd-direction), the minute objects R are magnified twice, for example, and are displayed (FIG. 18B). Further, when the observer moves the specimen K vertically (in the Pd-direction), the minute objects R are further magnified twice, and are displayed (FIG. 18C). When the specimen K is moved upward, the minute objects R may be reduced. In the image processing described above, the magnification ratio of the minute objects R can be changed by performing a simple operation on the specimen K.

Figure 19:
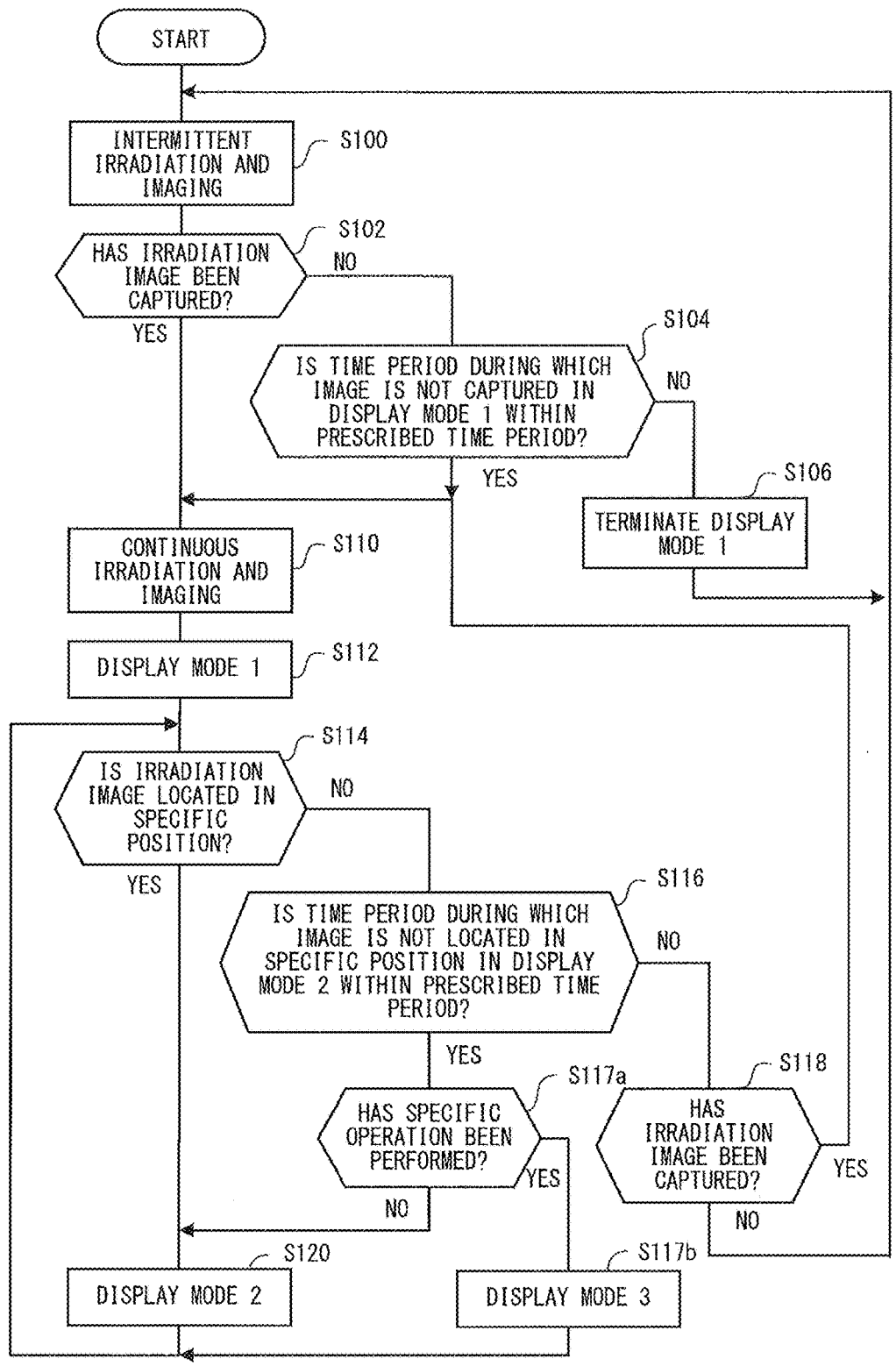
FIG. 19 is a flowchart explaining a procedure of display processing in which special image processing is added to the display processing of FIG. 15 according to the first embodiment.

An example of a procedure of display processing in the special image processing above is described next. FIG. 19 is a flowchart obtained by adding step S117a and step S117b as the special image processing to the display processing of FIG. 15. The flowchart of FIG. 19 is described below by principally describing step S117a and step S117b.

When the condition determiner 242 determines that the irradiation image 42m is not located in a specific position (NO in step S114), the condition determiner 242 determines whether a "specific operation" has been performed in addition to whether a time period during which the irradiation image 42m is not located in the specific position in display mode 2 is within a prescribed time period (step S116).

The specific operation is a prescribed operation performed on the main body 20 or the specimen K by an observer. The prescribed operation performed on the specimen K is the operation described with reference to FIG. 16A to FIG. 18C. In addition, the operation performed on the main body 20 is, for example, a tap operation, and is detected by a vibration sensor provided in the main body 20.

When the condition determiner 242 determines that the time period during which the irradiation image 42m is not located in the specific position in display mode 2 is within the prescribed time period (YES in step S116), the condition determiner 242 determines whether the specific operation has been performed (step S117a). When the condition determiner 242 determines that the specific operation has not been performed (NO in step S117a), the controller continues display mode 2 (step S120).

When the condition determiner 242 determines that the specific operation has been performed (YES in step S117a), the controller 240 switches from display mode 2 to display mode 3 for performing special image processing (step S117b). In step S116, display mode 2 is maintained during the prescribed time period, and therefore a change (the specific operation) such as swinging the specimen K within the prescribed time period can be effectively used as a user interface that reflects the intention of a user.

In display mode 3, the image processing unit 246 selects the type of special image processing according to the specific operation, and performs the selected image processing. In addition, the image processing unit 246 may switch the form of display mode 3, or may change a portion or target to be emphasized, in accordance with the specific operation.

The special image processing in display mode 3 includes, for example, a display of an animation of the minute objects R, a change in hue, and magnification or reduction, as described above. In addition, in display mode 3, the image processing unit 246 may display an auxiliary display, such as a display of a scale indicating the size of the minute object R or a display of a result of counting the number of minute objects R, in a virtual reality in accordance with the specific operation.

Further, in display mode 3, by using the similar image determination function above of the image processing unit 246, movement loci of the minute objects R may be displayed, or the minute objects R may be named and displayed. Respective parts of the minute objects R may be color-coded and displayed, or image processing may be performed on specific portions of the minute objects R such that the minute objects are highlighted.

The processing of the controller 240 returns to step S114 after step S117b. Even when the irradiation image 42m is located in the specific position (YES in step S114), the condition determiner 242 may determine whether the specific operation has been performed, as described in the determination of step S117a. This is because the specific operation can be performed while the irradiation image 42m is maintained in the specific position. Also in this case, the controller 240 switches from display mode 2 to display mode 3, and the image processing unit 246 selects the type of the special image processing according to the specific operation, and performs the selected image processing.

Figure 20:
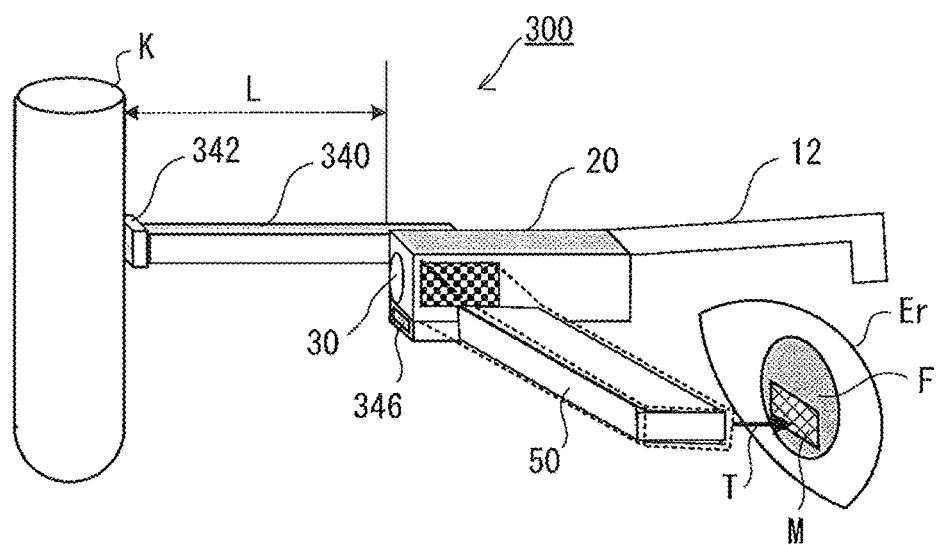
FIG. 20 illustrates an example of an image observation apparatus using a mechanical guide bar as a guide according to the first embodiment.

A variation of the guide 40 of the image observation apparatus 10 is described next. An example has been described above in which the image observation apparatus 10 includes, as a guide unit, a light emitter that projects the irradiation image 42m onto the specimen K. However, the guide unit is not limited to the light emitter. FIG. 20 illustrates an example of an image observation apparatus 300 using a mechanical guide bar 340.

The image observation apparatus 300 includes the guide bar 340 in a side portion of the imaging unit 30. The guide bar 340 is a member for which a length from the imaging unit 30 to the end of the guide bar 340 is the specific distance L. At the end of the guide bar 340, a switch 342 that detects contact with the specimen K is provided. The switch 342 may be a mechanical switch, or may be a proximity-detection-type optical switch. An output of the switch 342 is reported to the condition determiner 242. The condition determiner 242 determines whether the specimen K is located at the specific distance L from the imaging unit 30 in accordance with the output of the switch 342.

The image observation apparatus 300 also includes an illumination unit 346 that illuminates the specimen K below the imaging unit 30. The illumination unit 346 includes an illumination LED 45.

In the first embodiment above, the system controller 200 may change the diameter of an aperture diaphragm 33 of the imaging unit 30 so as to adjust a depth of field. In addition, the imaging unit 30 may include a focal position adjusting function including auto-focusing. When the imaging unit 30 includes the focal position adjusting function, the guide 40 and the focal position adjusting function may be properly used for rough positioning and fine adjustment, respectively. This is because, by employing a focal position adjusting function for which an adjustment range is narrow, the size of the imaging unit 30 can be maintained small.

In the description above, the condition determiner 242 performs determination in a case in which the "specific condition" is the specific distance L. However, as described above, the "specific condition" is not limited to a "distance" of the specimen K from the imaging unit 30, and includes the "orientation" of the specimen K with respect to the imaging unit 30. As an example, the "specific condition" may be, for example, that the surface of the specimen K is perpendicular to the optical axis 30c of the imaging unit 30. This is because a defocus is generated in upper and lower portions of a screen, for example, when the specimen K is inclined in forward and backward directions with respect to the optical axis 30c.

In this case, the condition determiner 242 determines whether the orientation of the surface of the specimen K is perpendicular to the optical axis 30c. Specifically, the condition determiner 242 compares the contrasts of images in peripheral positions of the captured image N, and can determine whether the surface of the specimen K is perpendicular to the optical axis 30c. In this case, determination accuracy can be improved by opening the aperture diaphragm 33 and reducing the depth of field.

<Effects of the First Embodiment>

By employing the image observation apparatus 10 according to the first embodiment, a magnified image is projected onto a portion of the pupil, and therefore an observer can observe a sample, cells, or the like while simultaneously comparing a specimen K in an image of the external world and the magnified image. By doing this, the magnified image can be easily observed without using a microscope, and the magnified image can be observed even in an environment in which it is difficult to use the microscope or the like.

The image observation apparatus 10 displays the magnified image only when the specimen K satisfies a specific condition (a focal position or a specific distance L) with respect to the imaging unit 30, and therefore an observer can confirm the alignment of the specimen K very easily. Consequently, the image observation apparatus 10 can stably display an appropriate magnified observation image. In addition, magnification display is performed at a timing at which the observer desires to perform observation, and therefore troublesome display switching can be eliminated. Further, an observation operation can be determined more naturally.

A display of a magnified image only in a case in which the specific condition is satisfied is suitable for the image observation apparatus 10 in which an image of the external world is always visually recognized. This is because it is convenient to an observer that a magnified image is not displayed at the time of defocusing such that a display object that shields the image of the external world is eliminated.

The image observation apparatus 10 determines whether the specimen K satisfies the specific condition, and controls irradiation with the guide light 42 or illumination light or the operation of the display 50. Therefore, a power source is managed very naturally, and a reduction in power consumption is achieved.

When the specimen K does not satisfy the specific condition, the image observation apparatus 10 projects a guide screen including information for alignment, instead of a magnified image, onto the pupil. Therefore, an observer can easily perform the alignment of the specimen K. By using a method for projecting guide light onto the specimen K so as to perform alignment, a lens movement mechanism for focusing or a focus detection means does not need to be provided in the imaging unit 30, and this results in a reduction in the size of the imaging unit 30. In the image observation apparatus 10, animation processing is performed on a magnified image, and this can make children interested in science.

<Second Embodiment>

In a second embodiment, an image observation apparatus 400 and an image observation apparatus 500 are described as an image observation apparatus that displays a magnified image in an entire field of view.

Figure 21:
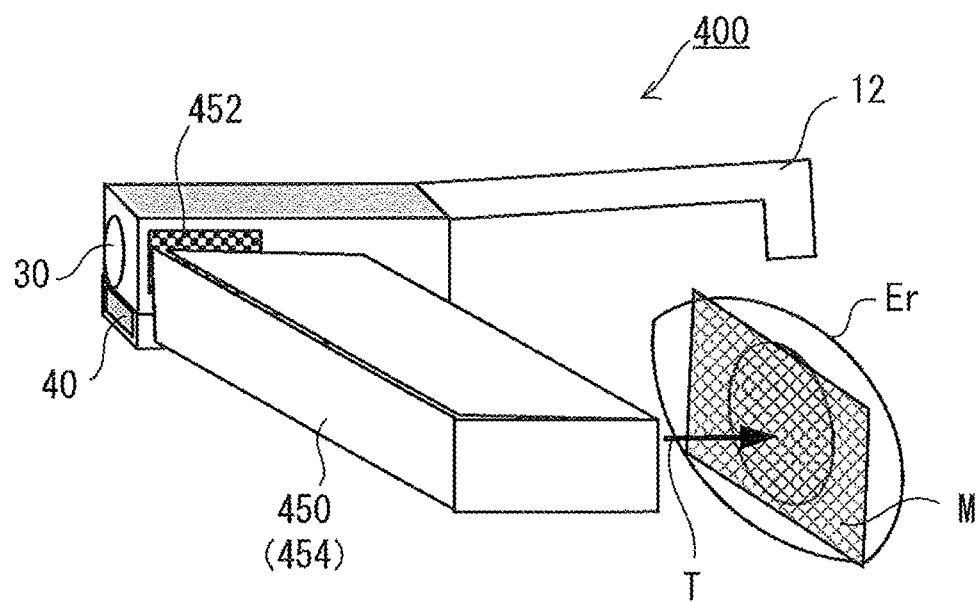
FIG. 21 illustrates the appearance of an image observation apparatus according to the second embodiment.

FIG. 21 illustrates the appearance of the image observation apparatus 400. The image observation apparatus 400 includes an imaging unit 30 and a guide 40 similarly to the image observation apparatus 10 according to the first embodiment. The imaging unit 30 includes an imaging optical system 32, which is a magnification optical system. The guide 40 irradiates a specimen K with guide light 42, and forms a spot-shaped irradiation image 42m. In addition, the guide 40 further includes an illumination function. The image observation apparatus 400 is described below by principally describing differences from the image observation apparatus 10 according to the first embodiment.

A display 450 projects a display image M having a size that covers an entire field of view onto the right eye Er (in a T-direction). The display 450 includes a display element 452 and a light guide 454. The aspect ratio of the display element 452 is different from that of the display element 52 according to the first embodiment, and it is preferable that the aspect ratio of the display element 452 be about 3:4. In addition, the light guide 454 is configured to be thicker in shape than the light guide 54 according to the first embodiment, such that the display image M is projected onto the entire field of view.

Figure 22:
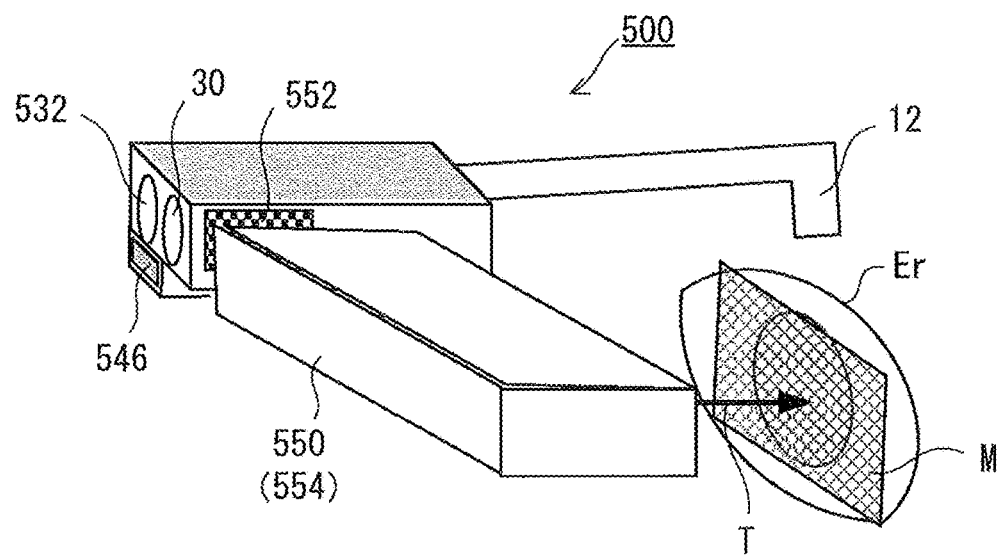
FIG. 22 illustrates the appearance of an image observation apparatus according to the second embodiment.

FIG. 22 illustrates the appearance of the image observation apparatus 500. The image observation apparatus 500 includes a second imaging unit 532 in addition to an imaging unit 30 that includes an imaging optical system 32, which is a magnification optical system. The second imaging unit 532 is arranged outside the imaging unit 30. The second imaging unit 532 is configured by different optical systems according to the purpose.

As the first example, the second imaging unit 532 is configured by an optical system that detects a distance from the specimen K in accordance with a phase difference from the imaging unit 30. In this case, a guide that performs the alignment of the specimen K is not needed, and therefore an illumination unit 546 is provided below the second imaging unit 532.

As the second example, the second imaging unit 532 is configured by a wide-angle optical system having an angle of view wider than that of the imaging unit 30. In this case, a magnified image is obtained by the imaging unit 30, and a normal image for which an angle of view is close to the angle of view of the naked eye is obtained. The second imaging unit 532 may include a distance measuring function or an AF function according to a contrast auto focus (AF) method or an imaging plane AF method. Similarly to the first embodiment, the second imaging unit 532 may be provided with the guide 40 using the guide light 42.

A display 550 projects a display image M having a size that covers an entire field of view onto the right eye Er (in a T-direction), similarly to the display 450. The display 550 includes a display element 552 and a light guide 554. The configurations of the display element 552 and the light guide 554 are similar to the configuration of the display 450, and therefore the description thereof is omitted. The display 550 may display a wide-angle image of the second imaging unit 532 and a magnified image captured by the imaging unit 30 in such a way that both of the images are switched with each other, or the display 550 may display the magnified image captured by the imaging unit 30 in a portion of the wide-angle image of the second imaging unit 532 in such a way that the magnified image captured by the imaging unit 30 is superimposed onto the portion of the wide-angle image of the second imaging unit 532.

Figure 23:
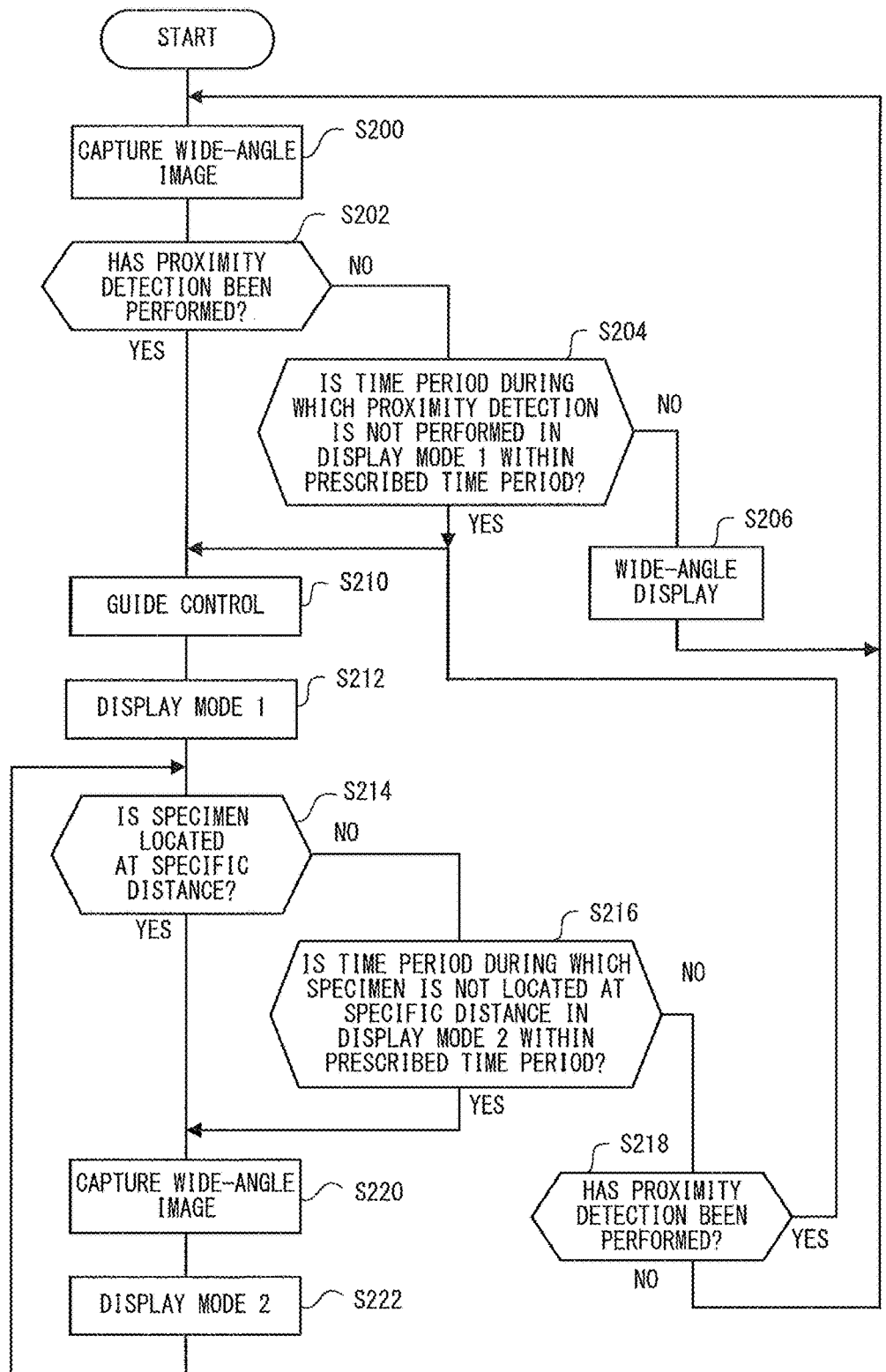
FIG. 23 is a flowchart explaining a procedure of display processing performed by the image observation apparatus of FIG. 21 according to the second embodiment.

FIG. 23 is a flowchart explaining a procedure of display processing performed by the image observation apparatus 500 of FIG. 22. The image observation apparatus 500 includes a system controller 200, an information obtaining unit 220 that includes the imaging unit 30 and the second imaging unit 532, and a controller 240 that includes a condition determiner 242 and a display controller 244. The controller 240 may include an image processing unit 246.

Assume that the second imaging unit 532 is configured by the wide-angle optical system in the second example and that the second imaging unit 532 includes the distance measurement function. The system controller 200 controls the imaging unit 30 and the second imaging unit 532 of the information obtaining unit 220, the condition determiner 242 and the display controller 244 of the controller 240, and the like such that the following processing is performed.

First, the information obtaining unit 220 performs imaging by using the second imaging unit 532, and obtains a wide-angle image (step S200). The display controller 244 displays the obtained wide-angle image on the display 550. The condition determiner 242 determines whether proximity detection has been performed in accordance with a result of distance measurement performed by the second imaging unit 532 (step S202). Proximity detection refers to detection of whether the specimen K is located in a position proximate to the specific distance L.

When the condition determiner 242 determines that proximity detection has been performed (YES in step S202), the controller 240 performs guide control (step S210). The controller 240 determines the content of a guide message and the position of an index for the alignment of the specimen K, as illustrated in FIG. 8C or FIG. 9C, in accordance with the result of distance measurement performed by the second imaging unit 532.

The controller 240 executes display mode 1 (step S212). Display mode 1 is a mode for displaying an image obtained by gradually magnifying a portion of a wide-angle image according to a distance. As the specimen K is located in a position closer to the specific distance L, a more magnified image is displayed. The magnified image is generated from a wide-angle image by an electronic zoom provided in the information obtaining unit 220. In display mode 1, the imaging unit 30 is maintained in the OFF state.

A guide message and an index, as illustrated in FIG. 8C, are superimposed onto the displayed image. The guide message and the index are generated by the image processing unit 246. The controller 240 may display only an image obtained by magnifying a portion of a wide-angle image by using the electronic zoom without displaying the guide message and the index in display mode 1. Display mode 1 is also referred to as a first display mode.

Return now to step S202. When the condition determiner 242 determines that proximity detection has not been performed (NO in step S202), the condition determiner 242 determines whether a time period during which proximity detection is not performed in display mode 1 is within a prescribed time period (step S204).

When the condition determiner 242 determines that the time period during which proximity detection is not performed in display mode 1 is within a prescribed time period (for example, three seconds) (YES in step S204), the processing of the controller 240 returns to step S210, and display mode 1 is continued. This is to prevent troublesome flickering of a screen by preventing a screen display from frequently switching.

When the condition determiner 242 determines that the time period during which proximity detection is not performed in display mode 1 is not within the prescribed time period (NO in step S204), display mode 1 is terminated and only the wide-angle image is displayed again (step S206), and the processing returns to step S200. When display mode 1 is still in the OFF state and the condition determiner 242 determines NO in step S202, only the wide-angle image continues to be displayed, and the processing returns to step S200.

The condition determiner 242 determines whether the specimen K is located at the specific distance L in display mode 1 (step S214). When the specimen K is located within a certain range from the specific distance L, the condition determiner 242 determines that the specimen K is located at the specific distance L.

When the condition determiner 242 determines that the specimen K is located at the specific distance L (YES in step S214), the controller 240 captures a magnified image by using the imaging unit 30 (step S220). The controller 240 shifts from display mode 1 to display mode 2 (step S222). Display mode 2 is a mode for displaying the magnified image captured by the imaging unit 30 on the display 50. The controller 240 turns on the imaging unit 30 in display mode 2. Display mode 2 is also referred to as a second display mode. The processing of the controller 240 returns to step S214 after step S222.

When the condition determiner 242 determines that the specimen K is not located at the specific distance L (NO in step S214), the condition determiner 242 determines whether a time period during which the specimen K is not located at the specific distance L in display mode 2 is within a prescribed time period (step S216). When the condition determiner 242 determines that the time period during which the specimen K is not located at the specific distance L in display mode 2 is within the prescribed time period (YES in step S216), the processing of the controller 240 moves on to step S220, and display mode 2 is continued. As described above, this is to prevent the flickering of a screen.

When the condition determiner 242 determines that the time period during which the specimen K is not located at the specific distance L in display mode 2 is not within the prescribed time period (NO in step S216), the condition determiner 242 determines whether proximity detection has been performed (step S218). When the condition determiner 242 determines that proximity detection has not been performed (NO in step S218), the controller 240 terminates display mode 2, and the processing returns to step S200. This is because the position of the specimen K has greatly deviated. The controller 240 turns off the imaging unit 30.

When the condition determiner 242 determines that proximity detection has been performed (YES in step S218), the processing of the controller 240 moves on to step S210. The controller 240 switches from display mode 2 to display mode 1.

<Variations>

In the description above, the image observation apparatus 500 is particularly a spectacle-type wearable observation apparatus. However, the image observation apparatus 500 is not limited to a wearable apparatus. The image observation apparatus according to this embodiment may be incorporated into a tablet-type terminal device 600.

As a conventional observation apparatus that anyone can use by performing a familiar operation, magnifying glasses are known. The tablet-type terminal device 600 only adjusts a focus during observation, and does not require a special operation, similarly to the magnifying glasses, and therefore the tablet-type terminal device 600 may be referred to as a magnifying-glass-type terminal. The tablet-type terminal device 600 is not equipment that is attached to the head, such as the image observation apparatus 400 or the image observation apparatus 500, but is equipment used on a hand, and therefore the tablet-type terminal device 600 can be said to be equipment equivalent to wearable equipment.

Figure 24A:
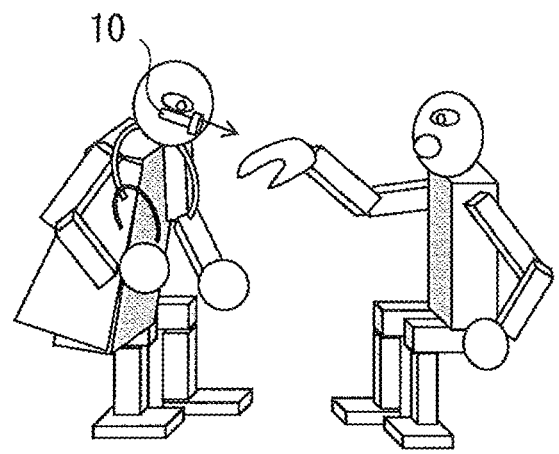
FIG. 24A illustrates a state in which a doctor who wears a wearable image observation apparatus is examining a patient according to the second embodiment.
Figure 24B:
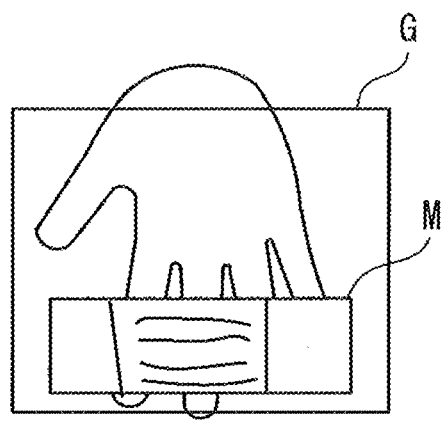
FIG. 24B illustrates a field of view of the right eye of a doctor who wears a wearable image observation apparatus according to the second embodiment.

FIG. 24A illustrates a state in which a doctor who wears a wearable image observation apparatus 10 is examining the surface of a patient's hand. FIG. 24B illustrates a field of view G of the right eye of the doctor, and a magnified image of their hand is displayed as a display image M in a portion of the field of view G.

Figure 24C:
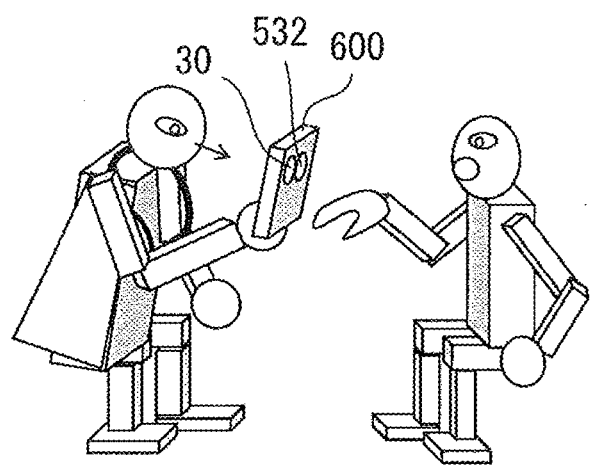
FIG. 24C illustrates a state in which a doctor is examining a patient by using a tablet-type terminal device according to the second embodiment.

FIG. 24C illustrates a state in which a doctor who holds the tablet-type terminal device 600 in their hand is examining the surface of a patient's hand. In the tablet-type terminal device 600, functions of the image observation apparatus 500 excluding the display 450 are provided. The tablet-type terminal device 600 includes an imaging unit 30 for capturing of a magnified image and a second imaging unit 532 for a wide-angle image, as an imaging unit. In the imaging unit 30, a proximity magnification optical system is provided.

Figure 24D:
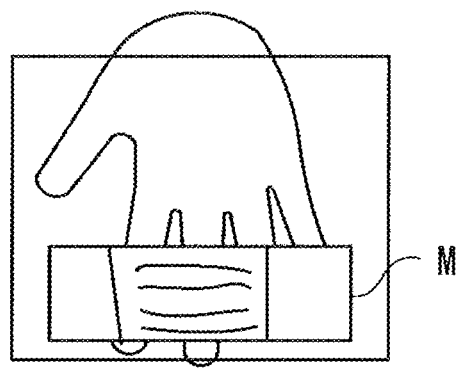
FIG. 24D illustrates a display screen of a tablet-type terminal device according to the second embodiment.

FIG. 24D illustrates a display screen of the tablet-type terminal device 600. An image obtained by superimposing a magnified image onto a portion of a wide-angle image is displayed on a display (not illustrated). The doctor can simultaneously observe an image indicating the entirety of a palm and a magnified image of a specific portion.

Similarly to the image observation apparatus 10 according to the first embodiment, the tablet-type terminal device 600 stops the operation of the display when the tablet-type terminal device 600 is not held over a specimen K. The determination of whether the tablet-type terminal device 600 is held over a specimen K may be performed by the guide 40 described in the first embodiment or the distance measurement function provided in the second imaging unit 532.

<Effects of the Second Embodiment>

By employing the image observation apparatus 400 (or 500) according to the second embodiment described above, a magnified image can be observed in a field of view larger than the field of view of the image observation apparatus 10, in addition to the effects of the first embodiment. The image observation apparatus 500 includes a wide-angle imaging unit in addition to an imaging unit that is a magnification optical system, and a wide-angle image having a normal size and a magnified image can be appropriately switched and used, and therefore a degree of freedom in observation increases.

In a proximity magnification optical system of the tablet-type terminal device 600, in general, a focusing range is narrow, and an imaging range is also narrow, and therefore it is difficult to stably image a target position of a specimen K. Accordingly, a state in which the tablet-type terminal device 600 continues to be stably held over a prescribed position of the specimen K during a prescribed time period can be estimated to be a state in which an observer is intentionally performing observation. In contrast, a state in which the tablet-type terminal device 600 has not been stably held over the prescribed position of the specimen K can be estimated to be a state in which the observer is not performing observation. By using this, the tablet-type terminal device 600 can achieve a reduction in power consumption without performing a special operation, by controlling the ON/OFF state of the imaging unit 30 for wide-angle imaging according to an image captured by the proximity magnification optical system.

<Effects of the First and Second Embodiments>

A wearable image observation apparatus that enables the observation of a magnified image of an object by incorporating an imaging unit of a magnification optical system mounted onto a microscope into a conventional spectacle-type display apparatus. However, it is unexpectedly difficult to stably image a target position of a specimen. According to the first and second embodiments described above, an image observation apparatus that enables an appropriate magnified observation image to be stably displayed can be provided.

In addition, the spectacle-type display apparatus according to the first and second embodiments (including the tablet-type terminal device 600 in the form of a magnifying glass) can provide an intuitive user interface, and can realize hands-free control. When a spectacle-type display apparatus is used, an observer often holds a specimen, and their hands are busy. Therefore, hands-free control is effective.

As described above, in general, in an imaging optical system and a proximity magnification optical system of a spectacle-type display apparatus, a focusing range is narrow, and an imaging range is also narrow. Therefore, in observation, the spectacle-type display apparatus needs to be stably held over a specimen in a prescribed position. Accordingly, a state in which the spectacle-type display apparatus has not been stably held over the specimen in a prescribed position can be estimated to be a state in which observation is not being performed. By utilizing this feature, the ON/OFF state of a light emitter or an illumination unit or the ON/OFF state of a display can be controlled at an appropriate timing without performing a special operation. Consequently, a reduction in power consumption can be achieved, and troublesome switching of a display can be eliminated, without any special consciousness of an observer or any special operation performed by the observer.

In the spectacle-type display apparatuses according to the first and second embodiment, various instructions to perform image processing can be issued by an observer moving a specimen including a flask, a test tube, a petri dish, an observation region, and an examination region, or by the observer approaching the specimen. Accordingly, the various instructions to perform image processing can be issued without any special consciousness of an observer or any special operation performed by the observer.

Note that the present invention is not limited exactly to the above embodiments, and can be embodied in the implementation phases by modifying constitutional elements without departing from the spirit of the present invention. Also, it is possible to form various inventions by an appropriate combination of a plurality of constituent elements disclosed in the above embodiments. For example, all of the constituent elements disclosed in the above embodiments may be combined appropriately. Further, constituent elements selected from different embodiments may be combined appropriately. It is as a matter of course that these various modifications and applications are possible without departing from the spirit of the present invention.

EXPLANATIONS OF LETTERS OR NUMERALS

1 Wearable image observation apparatus system
10, 15, 300, 400, 500 Image observation apparatus
20 Main body
30 Imaging unit
30c Optical axis
32, 62 Imaging optical system
33 Aperture diaphragm
35, 65 Image sensor
40 Guide
42 Guide light
42c Optical line
42m Irradiation image
42t Index image
43 Guide LED
44 Guide lens
45 Illumination LED
50, 450, 550 Display
52, 452, 552 Display element
54 Light guide
200 System controller
210 Power source
220 Information obtaining unit
240 Control unit
242 Condition determiner
244 Display controller
245 Movement detector
246 Image processing unit
340 Guide bar
532 Second imaging unit
546 Illumination unit
600 Tablet-type terminal device

What is claimed is:

1. An image observation apparatus comprising:
   an imaging unit that images a specimen and obtains a magnified image of the specimen;
   a display that displays an image;
   a condition determiner that determines whether a state of the specimen with respect to the imaging unit satisfies a specific condition; and
   a controller that displays the magnified image obtained by the imaging unit on the display when the condition determiner determines that the specific condition is satisfied, wherein the controller includes:
   an image processing unit that performs image processing on the magnified image displayed on the display; and
   a movement detector that detects a movement of the specimen in accordance with an image of the specimen captured by the imaging unit, and
   the image processing unit performs the image processing for changing a hue of the magnified image according to the movement of the specimen detected by the movement detector.

2. The image observation apparatus according to claim 1, further comprising:
   a guide that is configured to detect whether the specimen is located at a specific distance from the imaging unit, wherein
   the condition determiner determines that the state of the specimen with respect to the imaging unit satisfies the specific condition, when the condition determiner determines that the specimen is located at the specific distance from the imaging unit, by using the guide.

3. The image observation apparatus according to claim 1, wherein
   the controller displays, on the display, information for adjusting a position of the specimen with respect to the imaging unit, as a first display mode, until it is determined that the specific condition is satisfied, and the controller switches a display from the first display mode to a second display mode for displaying the magnified image on the display, when it is determined that the specific condition is satisfied.

4. The image observation apparatus according to claim 2, wherein
the guide includes a first light emitter that emits a spot light to the specimen, and
the first light emitter emits the spot light at the specific distance in a direction in which the spot light forms an image in a prescribed position on an image captured by the imaging unit.

5. The image observation apparatus according to claim 4, wherein
the guide includes a second light emitter that illuminates the specimen, and
the controller performs control to stop irradiation of the first light emitter and to cause the second light emitter to emit light, when the condition determiner determines that the specific condition is satisfied.

6. The image observation apparatus according to claim 4, wherein
the guide is provided below the imaging unit.

7. The image observation apparatus according to claim 4, wherein
the guide is provided in a side portion of the imaging unit.

8. The image observation apparatus according to claim 2, wherein
the guide includes a guide bar that extends in a direction of the specimen, and a switch is provided at an end of the guide bar, the switch detecting contact with the specimen that is located at the specific distance from the imaging unit.

9. The image observation apparatus according to claim 1, wherein
the display includes a display body that forms the magnified image, and a light guide that guides the magnified image formed by the display body to a pupil of an observer, and
the light guide displays the magnified image on a portion of the pupil of the observer.

10. The image observation apparatus according to claim 9, wherein
the display displays the magnified image in a lower portion of the pupil of the observer.

11. The image observation apparatus according to claim 1, wherein
the display includes a display body that forms the magnified image, and a light guide that guides the magnified image formed by the display body to a pupil of an observer, and
the light guide displays the magnified image in an entire field of view of the observer.

12. The image observation apparatus according to claim 9, further comprising:
a second imaging unit that captures a wide-angle image for which an imaging range is wider than that of the magnified image, wherein
the controller displays the wide-angle image captured by the second imaging unit on the display as a first display mode until it is determined that the specific condition is satisfied, and the controller switches a display from the first display mode to a second display mode for displaying the magnified image on the display, when it is determined that the specific condition is satisfied.

13. An image observation apparatus, wherein
the image observation apparatus according to claim 1 is in a form of spectacles.

14. An image observation apparatus comprising:
an imaging unit that images a specimen and obtains a magnified image of the specimen;
a display that displays an image;
a condition determiner that determines whether a state of the specimen with respect to the imaging unit satisfies a specific condition; and
a controller that displays the magnified image obtained by the imaging unit on the display when the condition determiner determines that the specific condition is satisfied, wherein
the controller includes:
an image processing unit that performs image processing on the magnified image displayed on the display; and
a movement detector that detects a movement of the specimen in accordance with an image of the specimen captured by the imaging unit, and
the image processing unit extracts a portion of the magnified image according to the movement of the specimen detected by the movement detector, and performs the image processing for continuously changing a form of the extracted portion.

15. An image observation apparatus comprising:
an imaging unit that images a specimen and obtains a magnified image of the specimen;
a display that displays an image;
a condition determiner that determines whether a state of the specimen with respect to the imaging unit satisfies a specific condition; and
a controller that displays the magnified image obtained by the imaging unit on the display when the condition determiner determines that the specific condition is satisfied, wherein
the controller includes:
an image processing unit that performs image processing on the magnified image displayed on the display; and
a movement detector that detects a movement of the specimen in accordance with an image of the specimen captured by the imaging unit, and
the image processing unit performs the image processing for changing a magnification of the magnified image according to the movement of the specimen detected by the movement detector.

* * * * *